United States Patent [19]

Takada

[11] Patent Number: 5,907,624
[45] Date of Patent: May 25, 1999

[54] NOISE CANCELER CAPABLE OF SWITCHING NOISE CANCELING CHARACTERISTICS

[75] Inventor: Masashi Takada, Tokyo, Japan

[73] Assignee: Oki Electric Industry Co., Ltd., Tokyo, Japan

[21] Appl. No.: 08/876,509

[22] Filed: Jun. 16, 1997

[30] Foreign Application Priority Data

Jun. 14, 1996 [JP] Japan ................... 8-154179

[51] Int. Cl.$^6$ ........................................ H04B 15/00
[52] U.S. Cl. ........................ 381/94.2; 704/226
[58] Field of Search ................ 381/94.1, 94.2, 381/94.3, 94.5, 71.1; 704/226, 233

[56] References Cited

U.S. PATENT DOCUMENTS

| | | | |
|---|---|---|---|
| 5,727,072 | 3/1998 | Raman | 381/94.2 |
| 5,757,937 | 5/1998 | Itoh et al. | 381/94.3 |
| 5,793,863 | 8/1998 | Hashimoto | 381/94.1 |

OTHER PUBLICATIONS

Masanori Akita et al., "A Method of Revising Spectral Envelopes Under the Noisy Environment for Speech Processing", Technical Report of IEICE, pp. 1–8, Nov. 1995.

Primary Examiner—Vivian Chang
Attorney, Agent, or Firm—Venable; Robert J. Frank

[57] ABSTRACT

A noise canceler of the present invention switches its noise canceling characteristic on detecting narrow band noise, and thereby executes noise cancellation adequately despite narrow band noise. Further, the noise canceler selects an output signal having a particular noise canceling characteristic, depending on whether or not a speech signal contained in an input acoustic signal is voiced. In addition, the noise canceler adaptively changes, for an acoustic signal containing voiced sound, a window function which regulates the depth of a valley of an attenuation characteristic meant for the acoustic signal. Therefore, the noise canceler improves an output signal with respect to the auditory sense and sound quality without regard to narrow band noise.

17 Claims, 16 Drawing Sheets

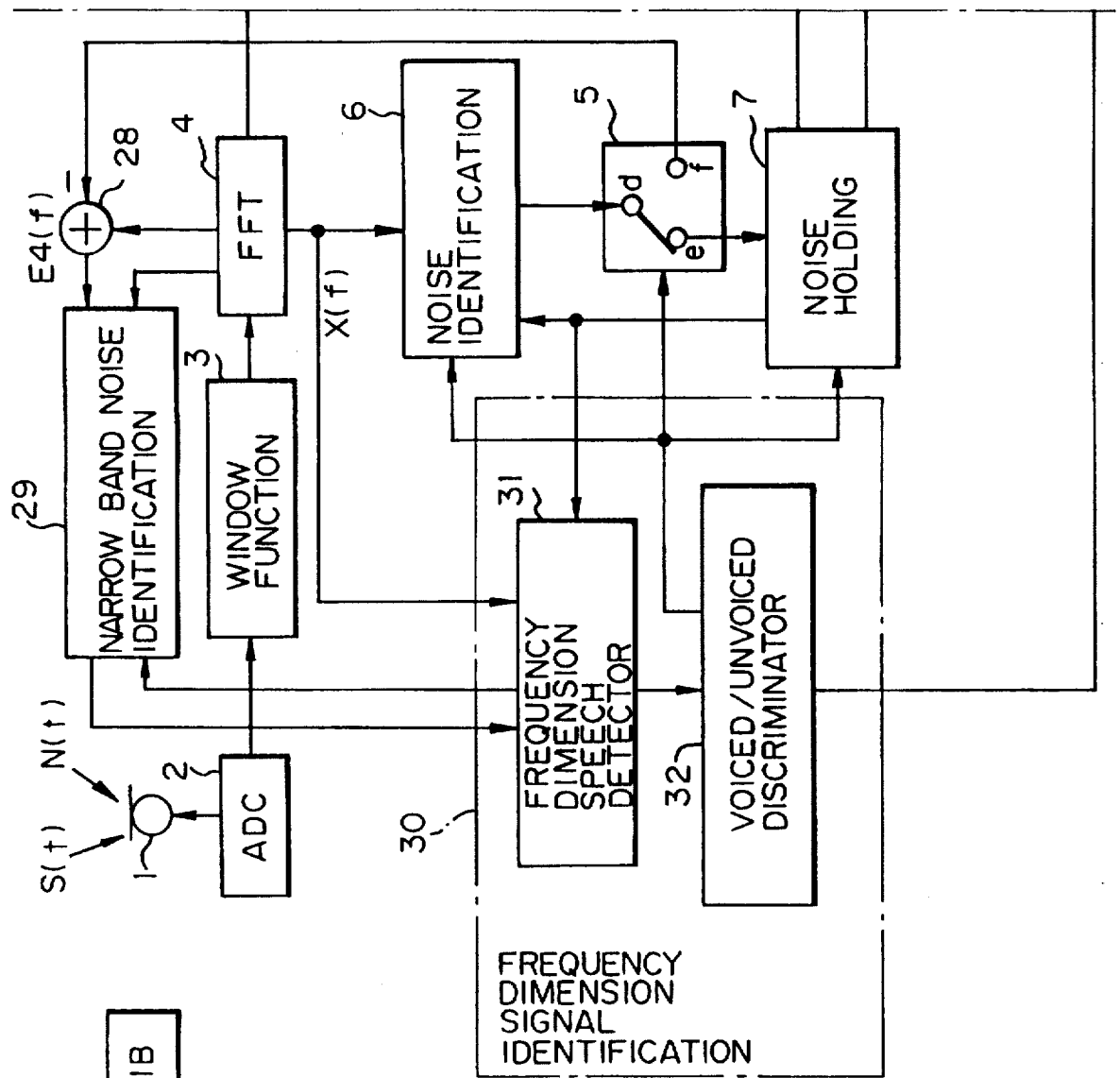

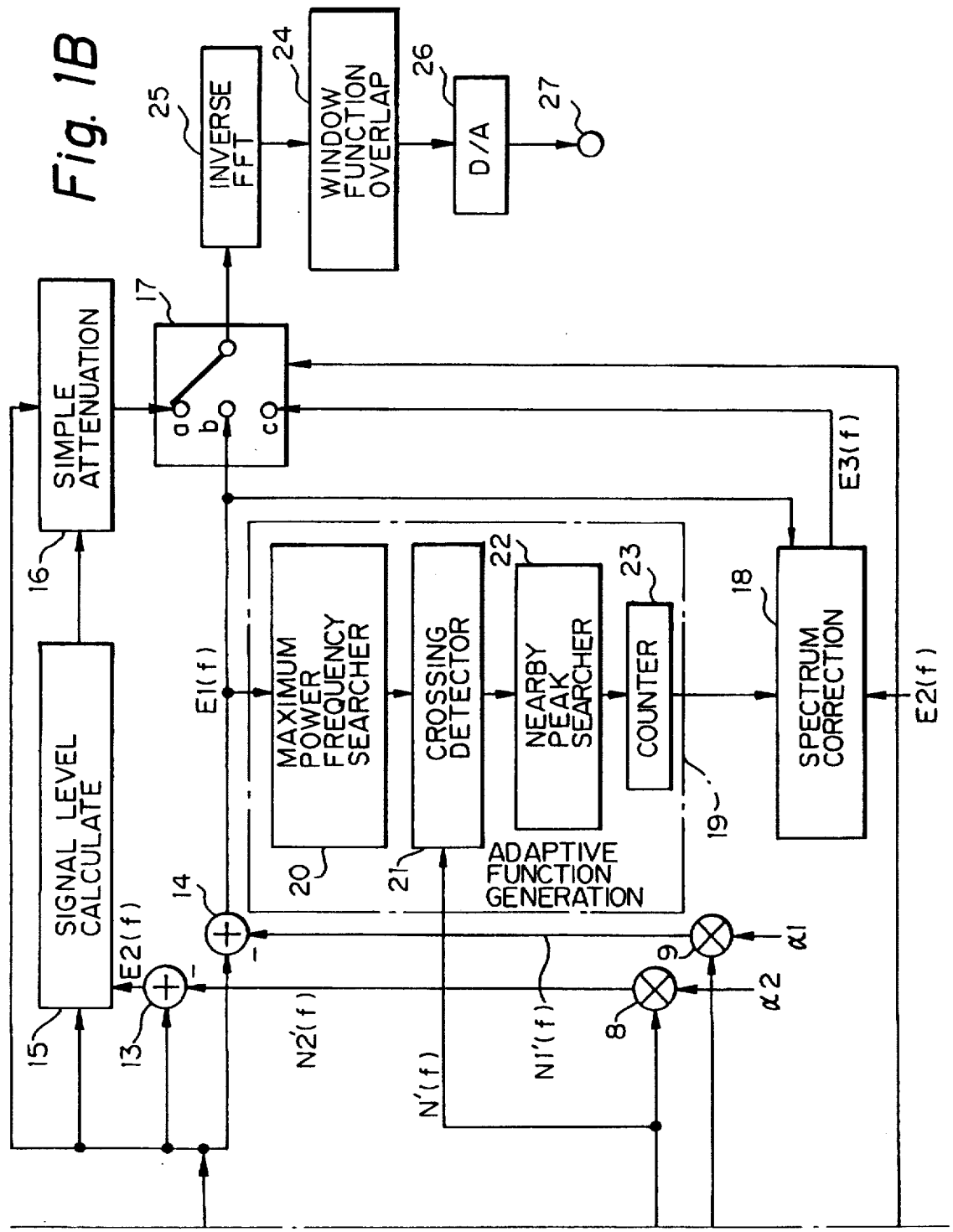

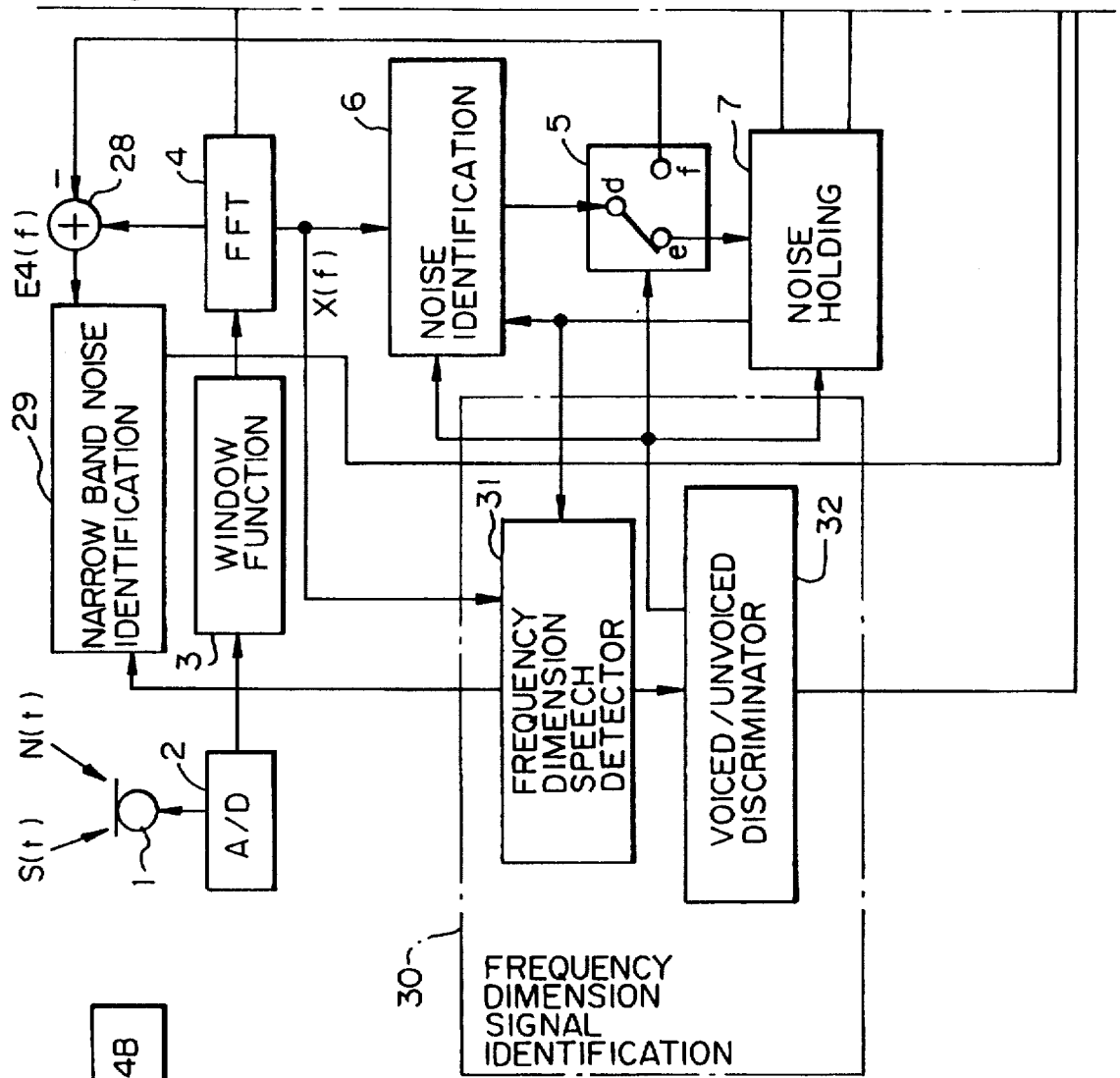

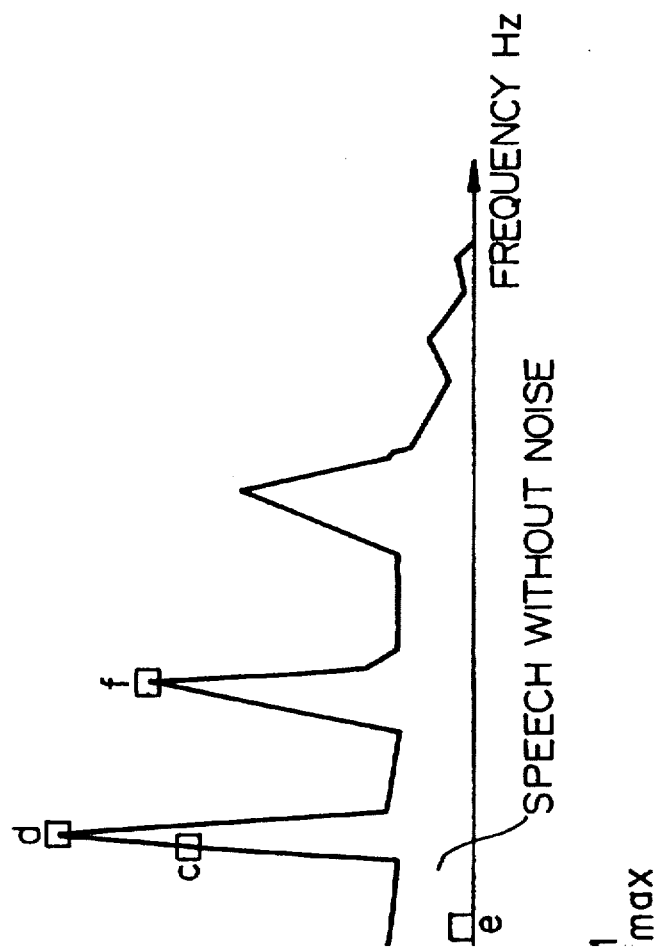

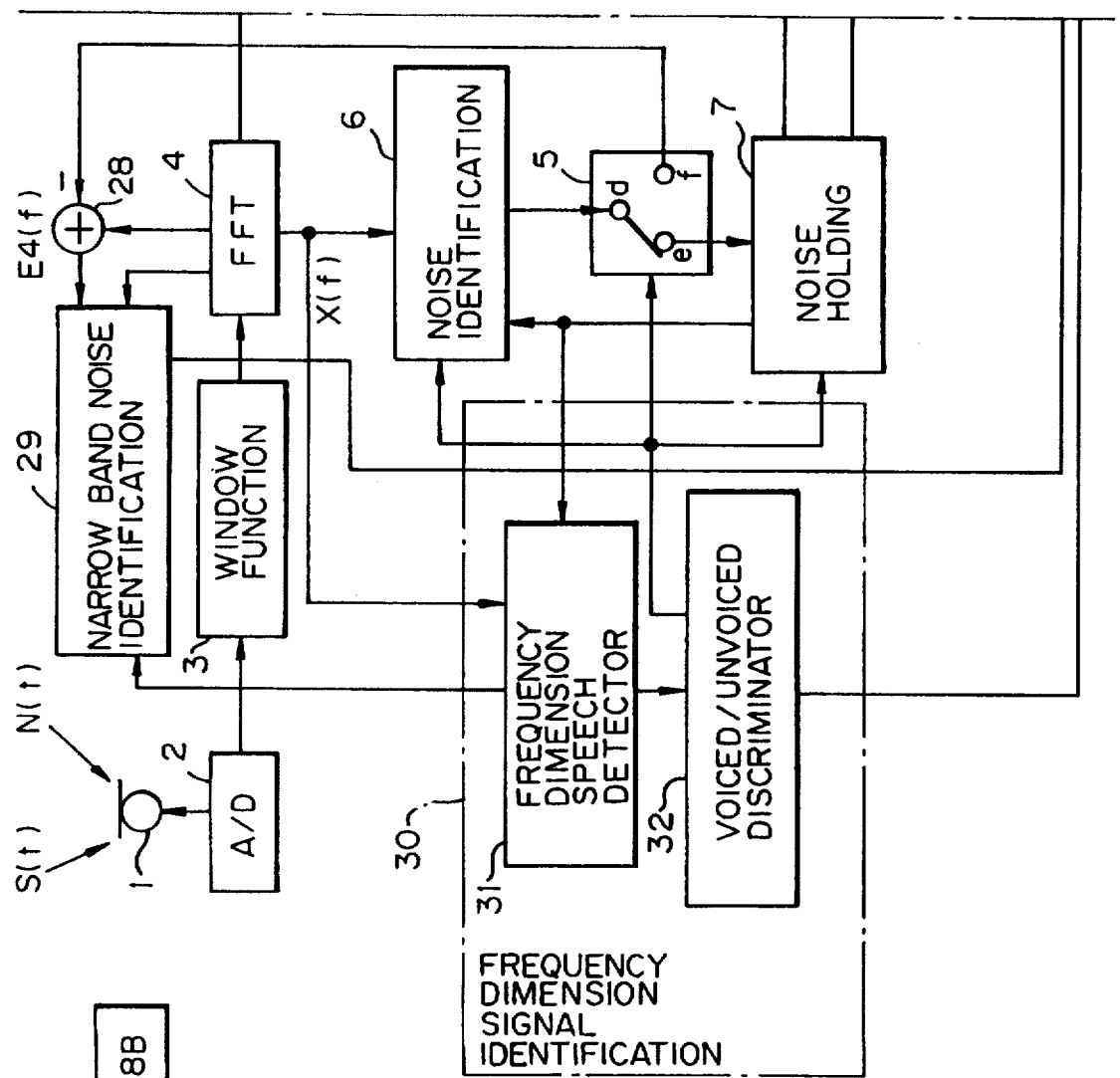

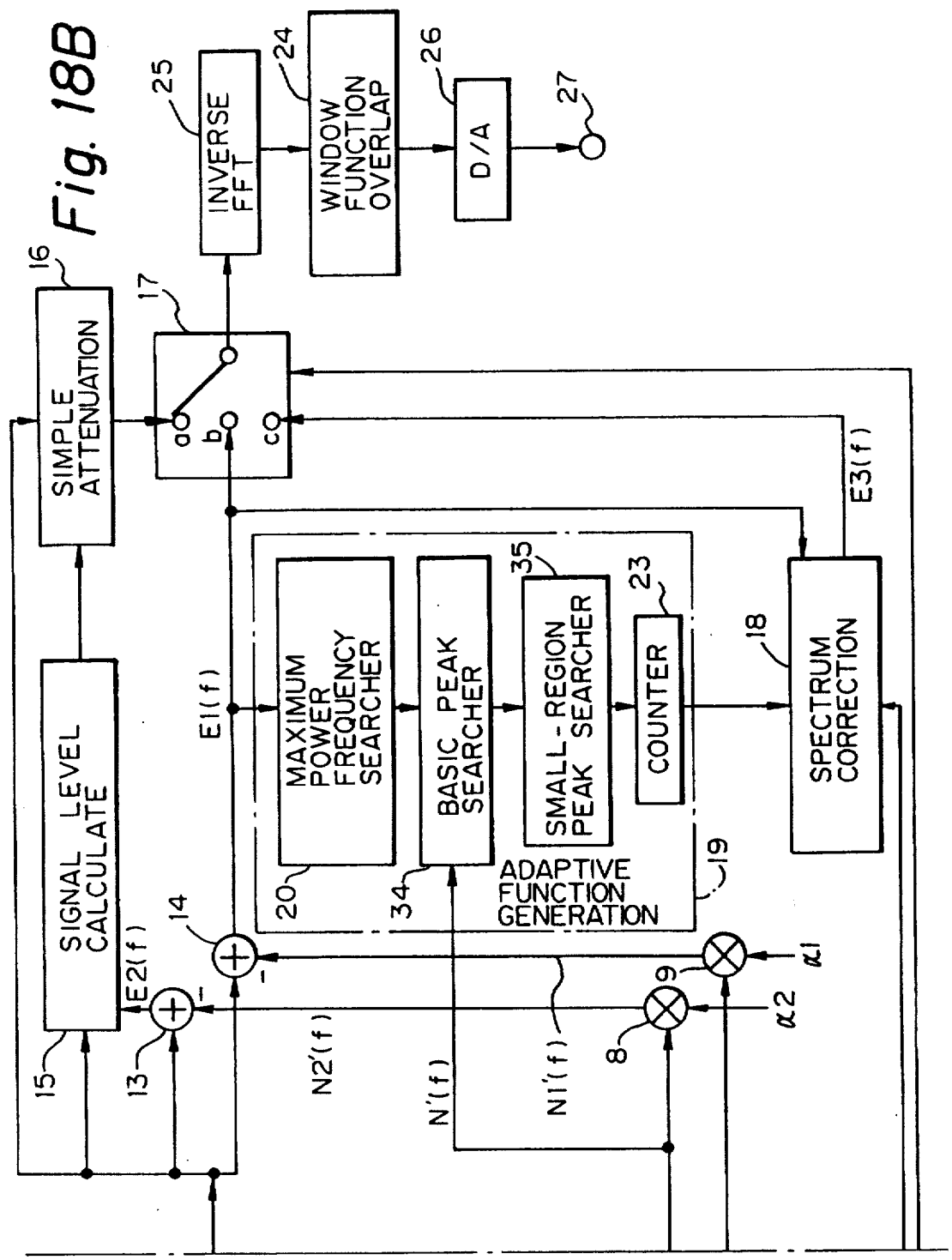

NOISE CANCELER CAPABLE OF SWITCHING NOISE CANCELING CHARACTERISTICS

BACKGROUND OF THE INVENTION

1. Field of the Invention

The present invention relates to a noise canceler for use in, e.g., a voice communication system, and capable of canceling background noise contained in an input acoustic signal and superposed on a speech signal.

2. Description of Background Art

A noise canceler for the above application is disclosed in, e.g., Masanori Akita and Takeshi Ohkura "A Method of Revising Spectral Envelopes under the Noisy Environment for Speech Processing", Technical Report of IEICE, EA95-57, November, 1995. The noise canceler includes an analog-to-digital converter (ADC). When a speech and noise derived from a speech source and a background noise source, respectively, are input to a microphone, the ADC converts them to a digital electric signal. A simple frequency or spectrum subtracting section executes Fast Fourier Transform (FFT) with the digital signal, and then executes simple frequency subtraction. A spectrum correcting section estimates and then restores valleys originally present in the speech signal input to the noise canceler, but lost in the output signal of the simple frequency subtracting section due to the limitation of low levels. In this manner, the conventional noise canceler reduces background noise by simple frequency subtraction and spectrum correction, and then restores and thereby enhances a speech spectrum. However, this kind of scheme has some problems left unsolved, as will be described specifically later.

SUMMARY OF THE INVENTION

It is therefore an object of the present invention to provide a noise canceler of the type using frequency subtraction (spectrum subtraction), and capable of canceling background noise, whether it contains narrow band noise or not, more desirably than the conventional noise canceler.

A noise canceler of the present invention includes a first transforming section for transforming an input acoustic signal on the time dimension to an acoustic signal on the frequency dimension. A signal identifying section determines whether or not the input acoustic signal consists only of background noise, or whether or not it contains a speech signal, or when it contains a speech signal, whether it is representative of voiced sound or unvoiced sound. A noise estimating section for detecting narrow band noise, e.g., pure tone estimates, in response to the acoustic signal output from the first transforming section, background noise while tracking the input acoustic signal to thereby output an estimated noise signal for detection of narrow band noise. A noise cancellation calculating section for narrow band noise detection subtracts, at least when the output signal of the signal identifying section is indicative of the presence of a speech, the estimated noise signal from the acoustic signal output from the first transforming section. A narrow band noise identifying section determines, based on a relation in level between the acoustic signal input to the noise cancellation calculating section and a corresponding signal output from the noise cancellation calculating section, whether or not the input acoustic signal contains narrow band noise, or detects the frequency range of the narrow band noise. The noise cancellation characteristic of the output signal of the noise canceler is varied in accordance with the output signal of the narrow band noise identifying section.

BRIEF DESCRIPTION OF THE DRAWINGS

The objects and features of the present invention will become more apparent from the consideration of the following detailed description taken in conjunction with the accompanying drawings in which:

FIG. 1 shows how FIGS. 1A and 1B are combined;

FIG. 1A and 1B are schematic block diagrams showing, when combined as shown in FIG. 1, a first embodiment of the noise canceler in accordance with the present invention;

FIG. 11 shows how

FIGS. 11A and 11B are schematic block diagrams showing, when combined as shown in FIG. 11, a second embodiment of the present invention;

FIG. 14 shows how FIGS. 14A and 14B are combined;

FIGS. 14A and 14B are schematic block diagrams showing, when combined as shown in FIG. 14, a third embodiment of the present invention;

FIG. 17 shows a specific signal output from the spectrum correcting section of the third embodiment; and FIG. 18 shows how FIGS. 18A and 18B are combined; and FIGS. 18A and 18B are schematic block diagrams showing, when combined as shown in FIG. 18, a fourth embodiment of the present invention.

DESCRIPTION OF THE PREFERRED EMBODIMENTS

Figure 2:
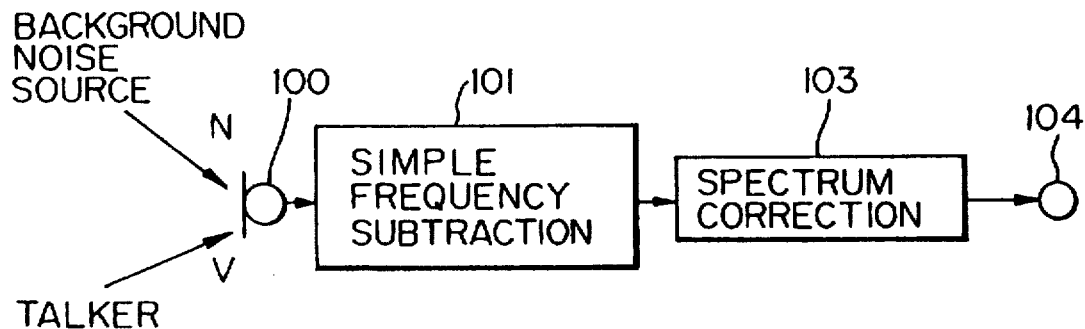
FIG. 2 is a schematic block diagram showing a conventional noise canceler.

To better understand the present invention, brief reference will be made to a conventional noise canceler, shown in FIG. 2. The noise canceler to be described is of the type taught in the previously mentioned document entitled "A Method of Revising Spectral Envelopes under the Noisy Environment for Speech Processing". As shown, a speech or voice V and noise N derived from a background noise source or sources are input to a microphone 100. The resulting output signal of the microphone 100 is converted to a digital signal by an ADC, not shown, and then applied to a simple frequency subtraction 101. First, the simple frequency subtraction 101 executes FFT with the input signal in order to transform the signal into a signal S(k) lying in the frequency domain. Subsequently, the subtraction 101 converts the frequency-domain signal S(k) to a signal S'(k) undergone simple frequency subtraction (simple spectrum subtraction) by using the following equations:

$$S'(k) = S(k) \quad \text{(when } S(k) > th(k)\text{)} \tag{1}$$
$$S'(k) = th(k) \quad \text{(when } S(k) \le th(k)\text{)}$$

$$th(k) = TH1 + 2 \cdot k \cdot (TH2 - TH1)/N \tag{2}$$

where th(k) denotes a low level limiting linear function modeling a steady colored noise environment, N denotes the number of FFT points, k denotes the spectral line of the "k" FFT point, and TH1 and TH2 each denotes a particular preselected threshold defining the linear function th(k). The simple frequency subtraction refers to lower level limiting processing effected with the spectral envelope of all the input signals. The subtraction 101 performs logarithmic transform with the signal S'(k) and then feeds it to a spectrum correction 103.

Figure 3:
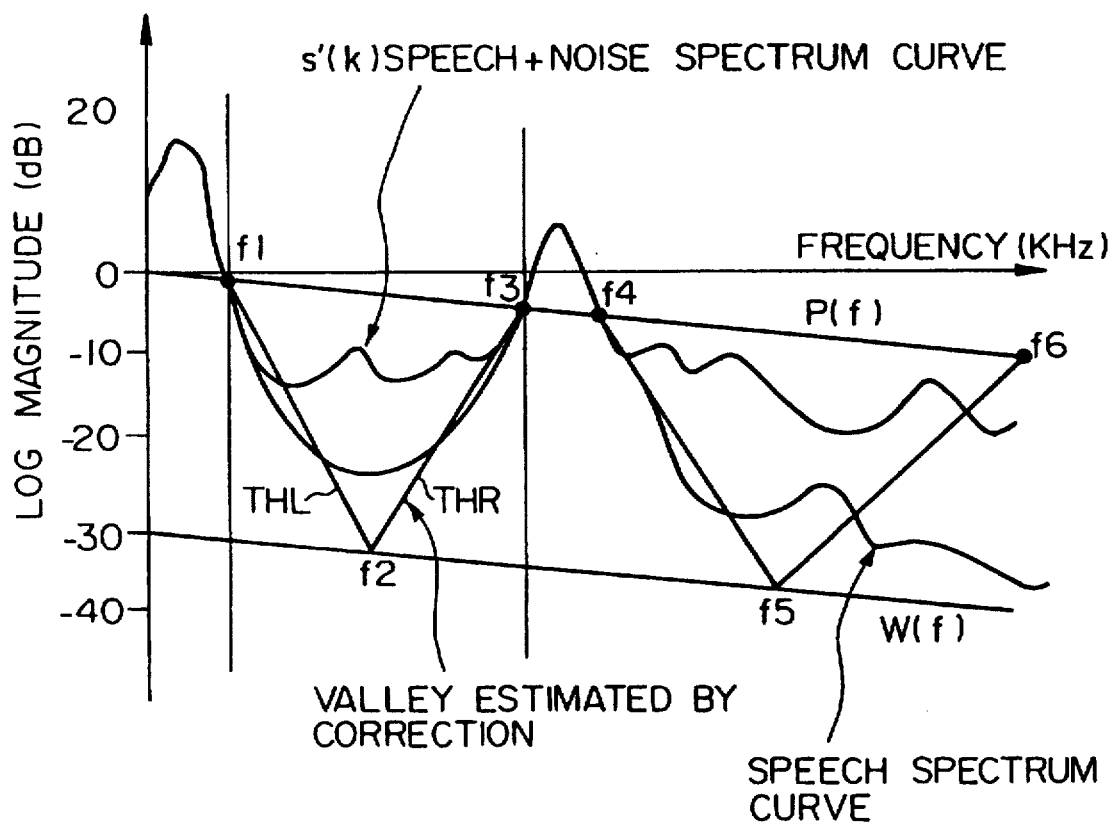
FIG. 3 is a spectral diagram demonstrating a specific operation of the conventional noise canceler.

How the spectrum correction 103 processes the input signal S'(k) is as follows. FIG. 3 shows a specific signal S'(k) output from the simple frequency subtraction 101. As shown, because the background noise is superposed on the speech signal, the signal S'(k) having its low levels limited lacks valleys originally present at the small spectrum portions of the speech signal. The spectrum correction 103 estimates a valley where the spectral power is small, and then restores it. Specifically, the correction 103 restores a valley by using a linear function THL(f) for the left part of the valley and a linear function THR(f) for the right part of the valley, as follows:

$$THL(f)=P(f1)+\{W(f2)-P(f1)\}\cdot(f-f1)/(f2-f1) \tag{3}$$

$$THR(f)=P(f3)+\{W(f2)-P(f3)\}\cdot(f3-f)/(f3-f2) \tag{4}$$

In each of the equations (3) and (4), P(f) denotes a linear function represented by an equation (5) shown below and modeling noise levels. The function P(f) is 0 dB (=TH1) to −10 dB (=TH2) within the frequency range of from zero to the Nyquist frequency. On the other hand, W(f) denotes a linear function represented by an equation (6) also shown below, but modeling the depths of valleys. The function W(f) is fixed at −30 dB (=TH3) to −40 dB (=TH4) within the above frequency range.

$$P(f)=TH1+f\cdot(TH2-TH1)/5000 \tag{5}$$

$$W(f)=TH3+f\cdot(TH4-TH3)/5000 \tag{6}$$

As to the first valley as counted from the lower frequency side, frequencies f1 and f3 appear higher than 1.2 kHz; the input signal S'(k) and the function P(f) modeling noise levels intersect each other at the points f1 and f3. A frequency f2 is the middle point between the frequencies f1 and f3 on the frequency dimension. As to the second valley, a frequency f4 appearing after the frequency f3 and where the input signal S'(k) crosses the pseudonoise level P(f) downward is dealt with in the same manner as the frequency f1. The next crossing point, i.e., a frequency F6 is dealt with in the same manner as the frequency f3. A frequency f5 is the middle point between the frequencies f4 and f6 and handled in the same manner as the frequency f2. When a frequency corresponding to the frequency f3 or f6 is not detected even after the search up to the Nyquist frequency or upper limit, the Nyquist frequency is substituted for the frequency f3 or f6;

only a single valley occurs with the frequency f3. FIG. 3 shows a specific case wherein a frequency corresponding to the frequency f6 has reached the Nyquist frequency.

In the above construction, the signal having its valleys restored on the basis of the characteristic on the frequency dimension is fed to a partial smoothing section, not shown, and has its high frequency range smoothed thereby. An inverse FFT processing, not shown, executes inverse FFT with the smoothed signal so as to restore the time-domain signal. The signal on the time dimension is fed via an output terminal 104 to a speech signal processing circuit following the noise canceler.

As stated above, the conventional noise canceler reduces background noise by simple frequency subtraction and spectrum correction, and then restores and thereby enhances the speech spectrum. However, this kind of conventional scheme has various problems left unsolved, as follows.

The function W(f) modeling the depths of valleys depends also on the condition of background noise, and is usually unknown. Because the conventional noise canceler fixes the function W(f), it is likely that the restored speech spectrum noticeably differs from the actual speech spectrum.

The noise canceler limits the number of valleys to be restored to two, as counted from the lower frequency side. In practice, however, more than two valleys are often required. Should the conventional scheme be directly applied to, e.g., voice communication, speeches would sound unnatural, resulting in low communication quality.

Generally, a speech signal has such a characteristic that its frequency component has greater frequency power in the low frequency range than in the high frequency range. As regards the functions P(f) and W(f), the conventional noise canceler applies the approximate lines even to the characteristic above the second valley on the frequency dimension. This fails to reflect the general characteristic of a speech signal. Specifically, high frequency noise remains and noticeably deteriorates the auditory sense when directly applied to, e.g., voice communication.

The conventional noise canceler is directed toward voiced sound. Therefore, the noise canceler distinguishes voiced portions and unvoiced portions on the basis of the results of measurement effected in noiseless environments beforehand. However, signals available in practice contain some noise and must be selectively transformed to voiced component signals or unvoiced component signals, assuming the introduction of noise. In this respect, mounting such a noise canceler to, e.g., a voice communication system is not practicable.

Moreover, when narrow band noise occurs in the background noise, the initial simple frequency subtraction cannot fully cancel the narrow band noise. As a result, the remaining narrow band noise is used to generate a valley, lowering speech quality.

Preferred embodiments of the noise canceler in accordance with the present invention will be described hereinafter.

FIRST EMBOCIMENT

Referring to FIGS. 1A and 1B, a noise canceler embodying the present invention will be described. As shown, a speech S(t) and/or background noise N(t) are input to a microphone 1 and transformed to an analog electric signal thereby. The analog signal output from the microphone 1 is applied to an ADC 2. The ADC 2 converts the analog signal to a digital signal with a desired sampling frequency, e.g., 8 kHz, and feeds the digital signal to a window function 3.

The window function 3 multiplies the input signal by a window function, a preselected frame length at a time. The resulting output x(k) of the processing 3, lying in the time domain, is input to an FFT 4. In the illustrative embodiment, the window function is implemented as a Hamming window although any other conventional window function may, of course, be used. In addition, a single frame length is assumed to consist of 256 samples by way of example.

The FFT 4 transforms, frame by frame, the output x(k) of the window function 3 to a frequency component X(f) lying in the frequency domain. A transform scheme for the FFT 4 may be any one of conventional schemes and will not be described specifically. The frequency component X(f) output from the FFT4 is delivered to a noise estimation 6, adders 13, 14 and 28, a signal level calculation 15, a simple attenuation 16, a narrow band noise identification 29, and a frequency dimension signal identification 30.

The frequency dimension signal identification 30 has a frequency dimension speech detector 31 and a voiced/unvoiced discriminator 32. The identification 30 controls switches 5 and 17, which will be described, depending on the kind of the signal on the frequency dimension. Specifically, the frequency dimension speech detector 31 receives the output of the FFT 4, i.e., the frequency dimension signal X(f) and an estimated noise signal N'(f) output from a noise holding 7. It is to be noted that the signal X(f) fed from the FFT 4 to the speech detector 31 is particular to a frame following a frame from which the noise signal N'(f) output from the noise holding 7 has been derived. Considering the fact that each signal on the frequency dimension is representative of the frequency characteristic of the "k" frame, the signal is, in the strict sense, expected to be labeled X(f, k) or N'(f, k). However, in the following description, the signal will be simply labeled X(f) or N'(f) when attention is paid to the frequency, or labeled X(k) or N'(k) when attention is paid to the order of the frame.

The frequency dimension speech detector 31 calculates, as to the current frame #k, the mean frequency power F_AV(k) of the output signal X(f) of the FFT 4, as follows:

$$F\_AV(k) = \Sigma\{X(f)\}^2\}/(ef-sf) \quad (7)$$

where ef and sf respectively denote a start frequency and an end frequency, the sum $\Sigma$ covers the start frequency sf to the end frequency ef, and (ef-sf) is representative of a frame length, i.e., the number of samples of a frame.

Also, the detector 31 calculates, as to the current frame #k, the mean frequency power N_AV(k) of the estimated noise signal N'(f, k-1):

$$N\_AV(k) = \Sigma\{N(f,k-1)\}^2\}/(ef-sf) \quad (8)$$

Subsequently, the detector 31 produces a mean power ratio VP(k) between the above mean power F_AV(k) and the mean power N_AV(k):

$$VP(k) = F\_AV(k)/N\_AV(k) \quad (9)$$

The detector 31 compares the mean power VP(k) with a preselected threshold voi_d, e.g., 1.5. If the mean power VP(k) is greater than the threshold voi_d, then the detector 31 feeds VP(k) to the voiced/unvoiced discriminator 32, determining that a speech signal is present. If the mean power VP(k) is smaller than the threshold voi_d, then the detector 31 does not feed VP(k) to the discriminator 32, determining that a speech signal is absent.

The detector 31 receives the output of the narrow band noise identification 29 and indicating whether or not narrow band noise is present. If the output of the identification 29 shows the presence of narrow band noise, then the detector 31 determines that a speech signal is absent although the mean power VP(k) may b e greater than the threshold voi_d. In this case, too, the detector 31 does not feed the mean power VP(k) to the voiced/unvoiced discriminator 32.

Further, the detector 31 searches for the maximum power level MAX (k) of the output signal X(f) of the FFT 4 throughout the frequencies sf to ef. At the same time, the detector 31 recognizes a frequency fmax corresponding to the maximum power level MAX(k). The detector 31 delivers the maximum power level MAX(k) to the voiced/unvoiced discriminator 32 while delivering it to the narrow band noise identification 29 together with the frequency or maximum frequency fmax.

Figure 4:
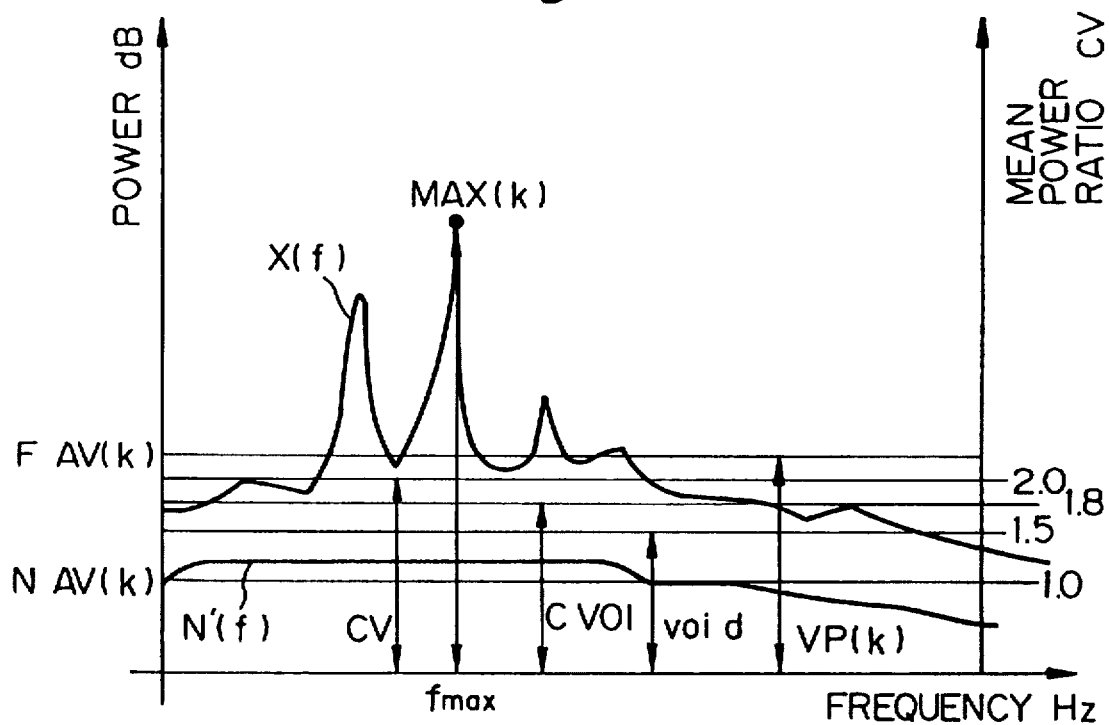
FIGS. 4 and 5 demonstrate a specific operation of a frequency dimension signal identifying section included in the first embodiment.
Figure 5:
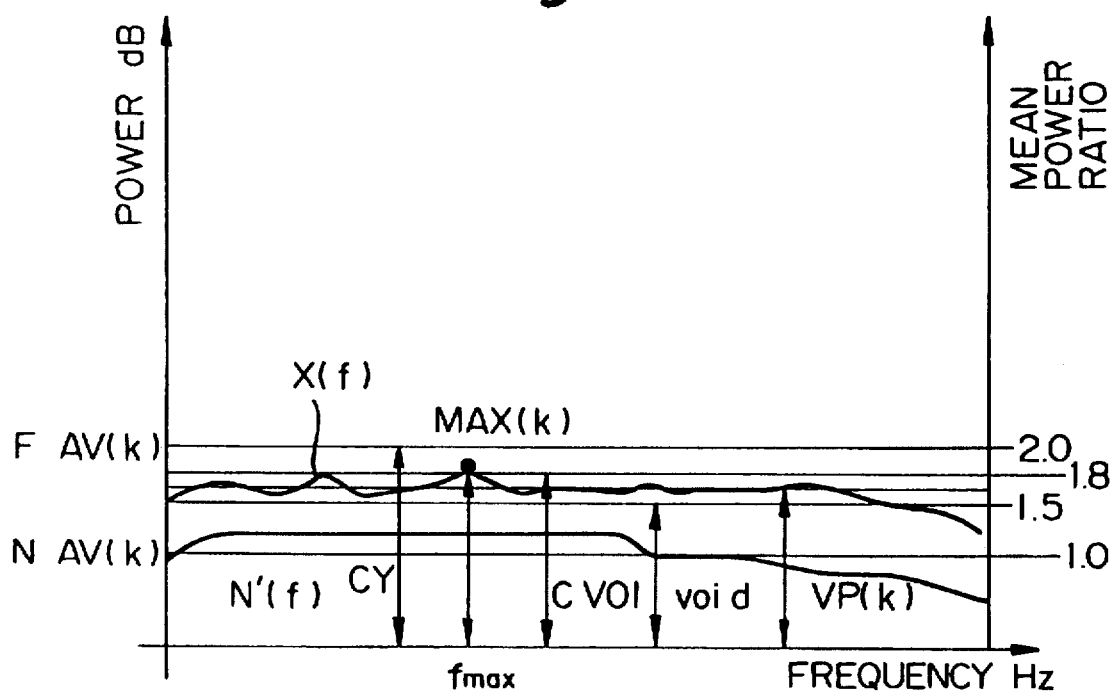

When the speech signal included in the input signal X(f) is representative of voiced sound, specific signals shown in FIG. 4 appear in the circuitry of FIG. 1. When the speech signal is representative of unvoiced sound, specific signals shown in FIG. 5 appear in the same circuitry. In FIGS. 4 and 5, the mean power and mean power ratio each is indicated by a normalized value, assuming that the mean power N_AV(k) of the estimated noise signal is 1.0.

The operation of the voiced/unvoiced discriminator 32 will be described with reference to FIGS. 4 and 5. First, assume that the discriminator 32 receives the mean power ratio VP(k) from the frequency dimension speech detector 31 (speech period). Then, the discriminator 32 compares the mean power ratio VP(k) with a preselected threshold C_VOI, e.g., 1.8. At the same time, the discriminator 32 compares with a preselected threshold CV, e.g., 2.0 the ratio between the maximum power level MAX (k) and the mean power VP(k) determined by the detector 31. Specifically, the discriminator 32 determines whether or not the following two conditions are both satisfied:

$$VP(k) \geq C\_VOI \quad (10)$$

$$MAX(k)/V\_AV(k) \geq CV \quad (11)$$

If the above conditions (10) and (11) are both satisfied, then the discriminator 32 determines that the speech signal is representative of voiced sound. If at least one of the conditions (10) and (11) is not satisfied, the discriminator 32 determines that the speech signal is representative of unvoiced sound. If desired, use may be made of alternative conditions which allow the discriminator 32 to compare a difference, as distinguished from a ratio, between the maximum power level MAX(k) and the mean power F_AV(k) with a preselected threshold.

The voiced/unvoiced discriminator 32 operates the previously mentioned switch 5 having one input terminal d and two output terminals e and f with a control signal, as follows. When the discriminator 32 receives the mean power VP(k) from the frequency dimension speech detector 31 (speech period), its control signal causes the switch 5 to select the output terminal f. When the discriminator 32 does not receive the mean power VP(k), the control signal causes the switch 5 to select the output terminal e. The control signal output from the discriminator 32 is applied to the noise estimation 6 also.

Further, the discriminator 32 sends a control signal to the switch 17 having three inputs a, b and c and one output. When the discriminator 32 does not receive the mean power VP(k) from the detector 31 (noise period; including a case based on the decision on narrow band noise), the control signal causes the switch 17 to select the input terminal a. When the discriminator 32 receives the mean power VP(k) (speech period), but determines that the speech signal is representative of unvoiced sound, the control signal causes the switch 17 to select the input terminal b. When the discriminator 32 receives the mean power VP(k) and determines that the speech signal is representative of voiced sound, the control signal causes the switch 17 to select the input terminal c.

The output signal X(f) of the FFT 4 is fed to the noise estimation 6. The initial input signal to the noise estimation 6 is assumed to be representative of only noise. In addition, the noise estimation 6 is basically expected to perform estimation during noise period, so a condition X(f)=N(f) should only be taken into account. Therefore, the operation of the estimation 6 will be described on the assumption that X(f)=N(f) holds.

The noise estimation 6 estimates, based on the signal X(f)=N(f) output from the FFT 4 and estimated noise signals N'(f) and N"(f) which it generated in the immediately preceding frame, background noise in the frequency domain and generates an estimated noise signal N'(f) or N"(f). Specifically, when the switch 5 is connected to the output terminal e (noise period), the noise estimation 6 generates the noise signal N'(f), as follows:

$$N'(f) = \gamma \cdot N'(f) + (1-\gamma) \cdot N(f) \quad (12)$$

where $\gamma$ denotes a mean estimated noise coefficient. The estimation 6 feeds the noise signal N'(f) to the noise holding 7 via the switch 5, causing the noise holding 7 to update its content. On the other hand, when the switch 5 is connected to the output terminal f (speech period), the estimation 6 generates the estimated noise signal N"(f) by use of the following equation:

$$N''(f) = \gamma'' \cdot N''(f) + (1-\gamma'') \cdot N(f) \quad (13)$$

where $\gamma''$ also denotes a mean estimated noise coefficient. The estimation 6 feeds the noise signal N"(f) to the adder 28 via the switch 5.

Although the computations represented by the equations (12) and (13) are both effected during speech period and noise period, the noise estimation 6 is so constructed as to produce a particular output during each of the speech period and noise period. Why the equations (12) and (13) are both effected during speech period and noise period is that the output of the estimation 6 should track the input signal N(f) even before and after the switching of the output.

The mean estimated noise coefficients $\gamma$ and $\gamma''$ included in the equations (12) and (13), respectively, are both variable. With small coefficients $\gamma$ and $\gamma''$, the estimation 6 is capable of generating the signals N'(f) and N"(f) sensitively to time variation. With great coefficients $\gamma$ and $\gamma''$, the estimation 6 is capable of generating the signals N'(f) and N"(f) stably against time variation. In the illustrative embodiment, when the entire noise canceler starts its initial operation, $\gamma$ and $\gamma''$ are both selected to be 0.2. On the elapse of 160 milliseconds since the beginning of a noise period, including a period determined to be a speech period due to narrow band noise, $\gamma$ and $\gamma''$ are increased to 0.5 and 0.7, respectively. However, such coefficients $\gamma$ and $\gamma''$ are only illustrative and may be replaced with any other suitable values matching a desired application, so long as they are smaller than 1.0 inclusive.

When the estimated noise signal N"(f) is to be produced on the basis of the equation (13), the switch 5 is held in connection with to the output terminal f (speech period), as stated earlier. The switch 5 therefore prevents the content of the noise holding 7 from being updated. As a result, the estimated noise signal N'(f) output from the noise holding 7 in the above condition has the same value throughout the frames.

When the input signal is representative of a speech (speech period), whether it be voiced or not, the switch 5 is caused to transfer the estimated noise signal N"(f) output from the noise estimation 6 to the adder 28 by the control signal output from the frequency dimension signal identification 30, as stated previously. When the input signal is not representative of a speech (noise period), the switch 5 is caused to deliver the estimated noise signal N'(f) output from the estimation 6 to the noise holding 7, as also stated earlier. However, when the input signal X(f) (=N(f)) representative of noise containing narrow band noise comes in, the identification 30 is apt to determine that a speech is present, because power centers around the narrow band (see FIG. 7).

In light of the above, the noise estimation 6 not only generates the estimated noise signal N'(f) using the mean estimated noise coefficient $\gamma$ which will be used for noise cancellation to be described later, but also generates, under the stable condition, the estimated noise signal N"(f) using the mean estimated noise coefficient smaller than the coefficient $\gamma$. In addition, the adder 28 and narrow band noise identification 29 are provided.

The adder 28 receives not only the estimated noise signal N"(f) output from the switch 5, but also the signal X(f) output from the FFT 4. The adder 28 subtracts the signal N"(f) from the signal X(f) and thereby produces a difference E4(f) in order to cancel noise, as follows:

$$E4(f) = X(f) - N''(f) \quad (14)$$

The resulting output signal E4(f) of the adder 28 is fed to the narrow band noise identification 29.

Figure 6:
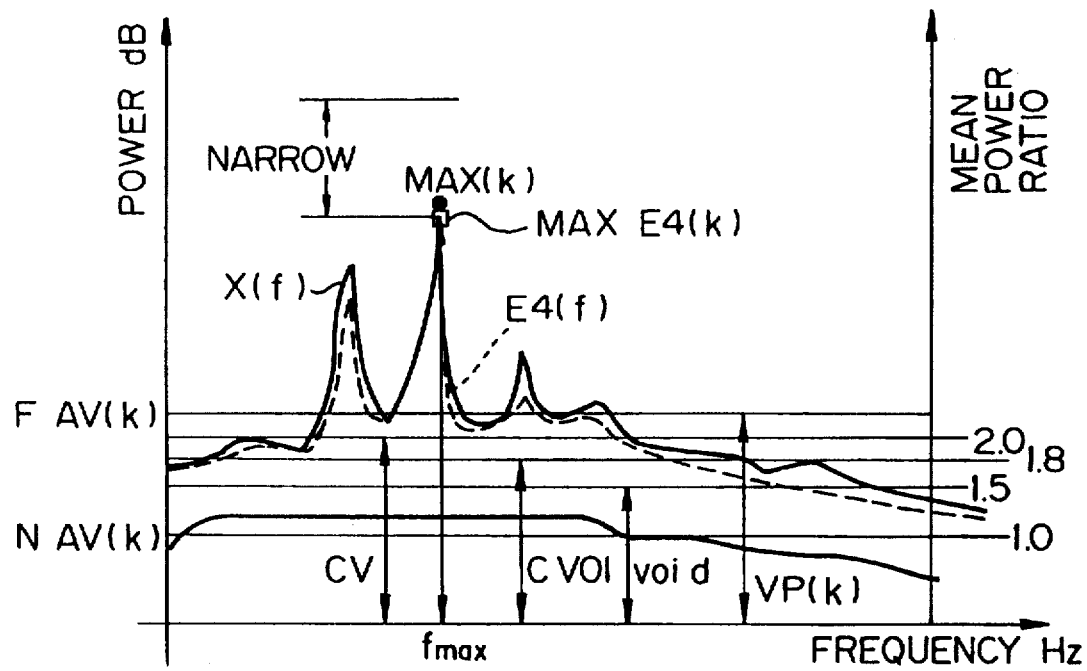
FIGS. 6 and 7 demonstrate a specific operation of a narrow band noise identifying section also included in the first embodiment.
Figure 7:
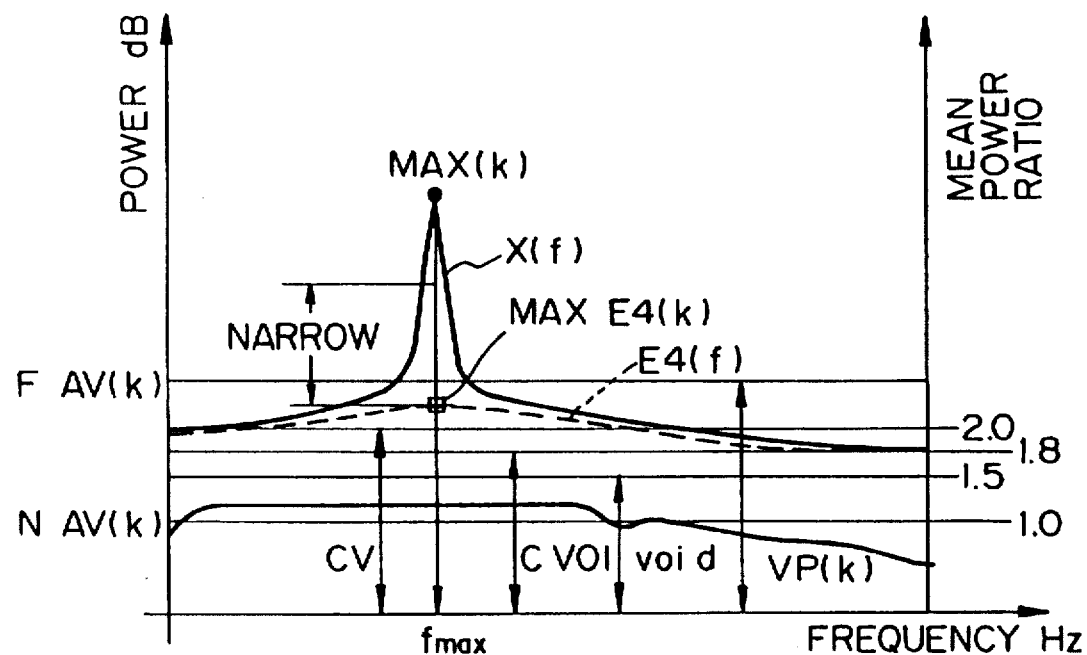

Reference will be made to FIGS. 6 and 7 for describing the function of the narrow band noise identification 29 in detail. FIGS. 6 and 7 respectively show a case wherein the signal X(f) contains a speech signal and a case wherein it consists only of noise containing narrow band noise. The identification 29 receives the maximum power level MAX (k) of the signal X(f) and the maximum frequency fmax of MAX (k) from the frequency dimension speech detector 31, as stated earlier. First, the identification 29 computes, as to the frame #k, a value E4(fmax) with a signal E4(k) corresponding to the maximum power level frequency fmax. Then, the identification 29 produces a difference MAX_E4 (k) between the maximum power level MAX(k) and the computed value E4(max):

$$MAX\_E4(k) = MAX(k) - E4(max) \quad (15)$$

Subsequently, the identification 29 compares the above difference MAX_E4(k) with a preselected threshold NARROW which may be, but not limited to, 10 dB. If the difference MAX_E4(k) is greater than the threshold NARROW, then the identification 29 determines that the signal X(f) is representative of background noise containing narrow band noise, i.e., that narrow band noise is present. If the difference MAX_E4(k) is smaller than the threshold NARROW, the identification 29 determines that the signal X(f) is representative of a speech.

As shown in FIGS. 6 and 7, when the signal X(f) contains a speech, the signal E4(k) undergone noise cancellation has a spectrum approximate to the signal X(f). When the signal X(f) is representative of noise containing narrow band noise, the spectrum of the signal E4(k) remains low in level even in the frequency band of the narrow band noise. This is why the identification 29 is capable of distinguishing a speech and narrow band noise with the above procedure.

In the above procedure, among all the frequencies of the signal X(f), only the maximum frequency is used for the distinction between a speech and narrow band noise. Alternatively, a plurality of local maximum values may be used in order to determine whether or not narrow band noise is present in a more synthetic manner.

The result of decision output from the narrow band identification 29 is fed to the frequency dimension signal identification 30. If the output of the identification 29 shows that narrow band noise is present, then the identification 30 forcibly replaces the presence of a speech, which is the result of detection, with the presence of noise.

As stated above, the switch 5 is connected to the output terminal f when a true speech signal appears, but connected to the output e when noise appears without regard to the presence/absence of narrow band noise. While the control signal meant for the switch 5 has been shown and described as being output from the voiced/unvoiced discriminator 32, it may alternatively be output from the frequency dimension speech detector 31.

The estimated noise signal N'(f) output from the noise estimation 6 is fed to the noise holding 7 via the switch 5, as stated earlier. Such delivery of the signal N'(f) to the noise holding 7 via the switch 5 occurs during noise period, as also stated earlier. The noise holding 7 stores the input signal N'(f) as a value Nkep(k) while delivering it to multipliers 8 and 9. The control signal output from the frequency dimension signal identification 30 and indicative of the presence/absence of a speech is also fed to the noise holding 7. In this embodiment, the noise estimation 6 executes estimation even during speech period (including a period erroneously detected due to narrow band noise). Therefore, should a speech period continue over a long period of time, the estimated noise signals N'(f) and N"(f) would be disturbed by the speech signal.

To solve the above problem, when a speech period continues over m (2 or greater integer) frames, the illustrative embodiment causes the noise holding 7 to deliver to the noise estimation 6 an estimated noise signal Nkep(k−m) stored therein m frames before. In response, the estimation 6 forcibly varies the estimated noise signals N'(k) and N"(k) of the current frame #k, as represented by:

$$N'(k) = Nkep(k-m) \quad (16)$$

$$N''(k) = Nkep(k-m) \quad (17)$$

In the equations (16) and (17), Nkep(k) is synonymous with Nkep(f, k). It is preferable that m number of frames be greater than the number of frames necessary for the presence of a speech, as erroneously detected due to narrow band noise, to be replaced with the absence of a speech on the detection of narrow band noise.

The estimated noise signal N'(F) output from the noise holding 7 is fed to a crossing detector 21 as well as to the multipliers 8 and 9. The multiplier 9 cooperates with an adder 14, an adaptive window function generation 19 and a spectrum correction 18 to generate an output signal when the input signal is indicative of the presence of a speech, depending on the operation of the previously mentioned switch 17. On the other hand, the multiplier 8 cooperates with an adder 13, a signal level calculation 15 and the simple attenuation 16 to generate an output signal when the input signal is indicative of the absence of a speech, also depending on the operation of the switch 17. The period in which a speech is absent, i.e., only background noise is present will be referred to as a noise period hereinafter.

The multiplier 9 multiplies the estimated noise signal N'(f) by a noise cancellation coefficient α1 (1.0≧α1≧0), and feeds its output signal N1'(f) (=α1·N'(f)) to the adder 14.

The multiplier 8 multiplies the estimated noise signal N'(f) by a noise cancellation coefficient α2 (1.0≧α2≧0), and feeds its output signal N2'(f) (=α2·N'(f)) to the adder 13. The coefficient α1 or α2 is adequately selected in the range smaller than 1.0 inclusive. Should the coefficient α1 or α2 be great, a speech introduced into noise would sound unnatural although much noise would be successfully cancelled. Should the coefficient α1 or α2 be small, a speech would sound natural although noise cancellation would be deteriorated. The illustrative embodiment selects a relation of 1.0≧α2≧α1≧0, e.g., α1=0.7 and α2=0.9.

The adders 13 and 14 each receives the output signal X(f) (or N(f) during noise period) from the FFT 4. The adders 13 and 14 each subtracts the output signal N2'(f) and N1'(f) of the associated multiplier 8 or 9 from the signal X(f), thereby canceling a noise component represented by the signal X(f). Both the adders 13 and 14 execute the same subtraction without regard to whether or not the input signal includes a speech signal. However, in a noise period wherein a speech signal is absent, the signal X(f) is representative of only the noise component N(f). Therefore, if the noise estimation 6 has estimated background noise accurately, the estimated noise signal N'(f) can be considered to be identical with the noise component N(f) of the input signal. It follows that a signal E1(f) output from the adder 14 may be expressed as:

$$E1(f) = N(f) - N1'(f) \quad (18)$$
$$= N(f) - \alpha1 \cdot N'(f)$$
$$= (1 - \alpha1) \cdot N(f)$$

Likewise, a signal E2(f) output from the adder 13 may be expressed as:

$$E2(f) = N(f) - N2'(f) \quad (19)$$
$$= N(f) - \alpha2 \cdot N'(f)$$
$$= (1 - \alpha2) \cdot N(f)$$

Because the coefficients α1 and α2 are so selected as to satisfy the relation of 1.0≧α2≧α1≧0, the output signal E1(f) of the adder 14 is constantly greater than the output signal E2(f) of the adder 13 during noise period. In addition, during speech period wherein the input signal includes a speech signal, the switch 5 is connected to the output terminal f and causes the estimated noise signal N'(f) output from the noise holding 7 to hold the same value. Therefore, the output signal E1(f) of the adder 14 may be expressed as:

$$E1(f) = (1-\alpha1) \cdot N(f) + S(f) \quad (20)$$

where S(f) is a component which the FFT 4 outputs in response to the input speech S(t).

Likewise, the output signal E2(f) of the adder 13 may be expressed as:

$$E2(f) = (1-\alpha2) \cdot N(f) + S(f) \quad (21)$$

The output signal E2(f) of the adder 13 is applied to the signal level calculation 15 and spectrum correction 18. The output signal E1(f) of the adder 14 is fed to the input terminal b of the switch 17, adaptive window function generation 19, and spectrum correction 18.

The signal level calculation 15 calculates, as power level information derived from the output signal E2(f) of the adder 13 (undergone noise cancellation), a sum L2 of levels in absolute value, as follows:

$$L2=\Sigma|E2(f)| \quad (22)$$

In addition, the calculation 15 calculates, as power level information derived from the output signal of the FFT 4 (N(f) because it has not undergone noise cancellation and is effective during noise period), a sum L3 of levels in absolute value, as follows:

$$L3=\Sigma|N(f)| \quad (23)$$

In each of the above equations (22) and (23), the sum $\Sigma$ covers the start frequency sf to the end frequency ef (=4 kHz) in the frequency domain. If desired, the power level information may be implemented as a sum of square means.

The calculation 15 produced the sums L2 and L3 computes an attenuation coefficient $\gamma 4$ by use of the following equation:

$$\gamma 4 = L2/L3 \quad (24)$$

The calculation 15 feeds the attenuation coefficient $\gamma 4$ to the simple attenuation 16. While the calculation 15 produces the attenuation coefficient $\gamma 4$ in the form of a ratio of the output signal E2(f) of the adder 13 to the output signal N(f) of the FFT 4, the output signal E2(f) may be replaced with the output signal E1 (f) of the adder 14, if desired.

The simple attenuation 16 multiplies the output signal of the FFT 4 (N(f) because it is effective during noise period) by the attenuation coefficient $\gamma 4$, thereby outputting a frequency component signal N(f)$\gamma 4$(f) having a low level. The signal N(f)$\gamma 4$(f) is fed from the attenuation 16 to the input terminal a of the switch 17 which is selected during noise period, i.e., speechless period. The level of the signal $\gamma 4$N(f) is equal to one produced by converting the level of the output signal N(f) of the FFT 4 to that of the output signal E2(f) of the adder 13. In addition, the signal $\gamma 4$N(f) is free from distortion ascribable to the noise canceling procedure.

The output signal E1(f) of the adder 14 is applied to the adaptive window function generation 19 having a maximum power frequency searcher 20, a local peak searcher 22 and a counter 23 in addition to the previously mentioned crossing detector 21. The signal E1(f) output from the adder 14 is fed to the maximum power frequency searcher 20. The generation 19 performs window function processing in accordance with the frequency characteristic of the input signal E1(f), as follows.

How the generation 19 generates window functions, i.e., how its constituent parts 20–23 function will be described with reference to FIGS. 8 and 9. The maximum power frequency searcher 20 receives the output signal E1(f) of the adder 14, a s stated earlier. In response, the frequency searcher 20 searches for, among the frequencies of the signal E1(f), the maximum frequency fmax corresponding to the maximum power. In the specific diagram shown in FIG. 8, the maximum frequency fmax appears at a point a. The maximum frequency fmax (point a) is used as a reference for window function processing. Window function processing is repeated a preselected number of times at both sides of the maximum frequency fmax. In the case shown in FIG. 8, window function processing is repeated twice at each side of the maximum frequency fmax or point a, i.e., five window functions are generated in total by way of example.

Figure 8:
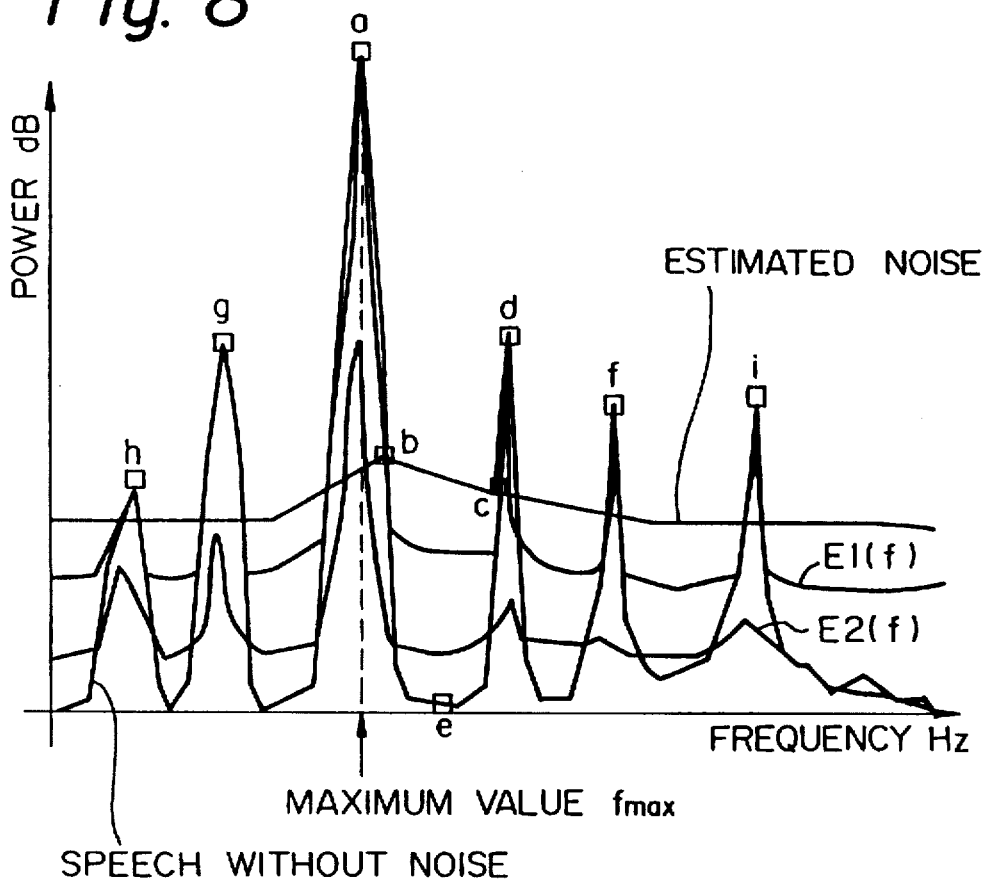
FIGS. 8 and 9 demonstrate a specific operation of an adaptive window function generating section further included in the embodiment.

In FIG. 8, assume the frequency range between the above point a and a point d adjacent to the point a at the higher frequency side and where a frequency corresponding to peak power appears. On determining the frequency point a indicative of the maximum power, the frequency searcher 20 feeds the maximum frequency fmax to the crossing detector 21

The estimated noise signal N'(f) output from the noise holding 7 and the output signal E1(f) of the adder 14 are also applied to the crossing detector 21. The crossing detector 21 determines the sign of a difference CR(f) between the two signals E1(f) and N'(f) with respect to each frequency above the maximum frequency point a, as follows:

$$CR(f)=E1(f)-N'(f) \quad (22\text{-a})$$

In the specific case shown in FIG. 8, the sign of the difference CR(f) is reversed at the point b first, and therefore the crossing detector 21 determines the point b to be a crossing. As the detector 21 repeats such a procedure with the other frequency points above the maximum frequency point a, it detects another crossing c where the sign of the difference CR(f) is reversed. Then, the detector 21 determines the middle point e between the crossings b and c, and feeds the middle point e to the local peak searcher 22. It is to be noted that the middle point e between the crossings b and c on the frequency dimension corresponds to the frequency at the valley of a window function.

The local peak searcher 22 also receives the output signal E1(f) of the adder 14. The searcher 22 computes the slope def(f) of the signal E1(f) by using the following equation:

$$def(f)=E1(f+1)-E1(f) \quad (23\text{-a})$$

The searcher 22 sequentially repeats the above computation upward from the point e (frequency fe) while seeing if the sign of the slope def(f) is reversed. When the sign of the slope def(f) is reversed, the searcher 22 determines that a peak has appeared in the signal E1(f). In the specific case shown in FIG. 8, a peak appears at the point d, as determined by the searcher 22.

Figure 9:
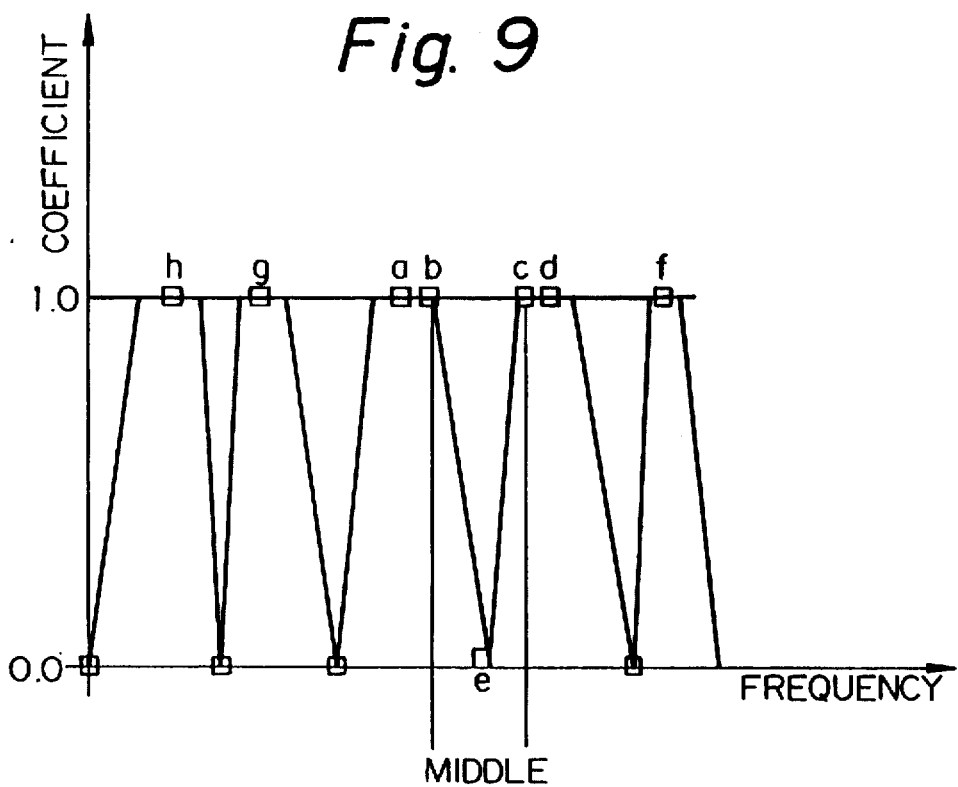

By the above procedure, a window function having the peaks b and c and valley e is generated, as shown in FIG. 9. Assume that the window function has coefficients W(f) expressed as:

| | | |
|---|---|---|
| w(f) = 1.0 - (f - fb) / (fe - fb) | fb $\leq$ f $\leq$ fe | |
| w(f) = (f - fe) / (fc - fe) | fe < f $\leq$ fc | |
| w(f) = 1.0 | fa < f $\leq$ fb and fc < f $\leq$ fd | |
| | (24-a) | |

On generating one window function, as stated above, the searcher 22 delivers information indicative of the generation to the counter 23. In response, the counter 23 is incremented by 1 (one).

After the window function based on the maximum frequency point a has been generated by the above procedure, the point d is substituted for the point a as the next maximum frequency point or reference point. Then, the crossing detector 21 and nearby peak searcher 22 repeat the same procedure with the frequencies above the point d until the counter 23 reaches a preselected value representative of a desired number of window functions.

It is to be noted that at the peak of the window corresponding to the end point, the characteristic connecting the peak and the valley of the window function is used after being folded back. For example, when the generation of a window function ends at the point d, the characteristic connecting the points d, c and e is folded back to the higher frequency side on the frequency dimension, forming a mirror image.

As for the window function processing with the frequencies below the maximum frequency fmax or point a, the above procedure is repeated in exactly the same manner except for the direction in which it proceeds.

In the illustrative embodiment, the adaptive window function generation 19 generates two window functions at each side of the maximum frequency fmax (point a).

Therefore, as shown in FIG. 9, a range in which no window functions are generated occurs even in the range lower than the Nyquist frequency; that is, a frequency range with a coefficient 0.0 occurs.

The window functions (window function coefficients W(f)) adaptively generated by the window function generation 19 in accordance with the contents of the signal E1(f) are sequentially delivered to the spectrum correction 18. Also delivered to the spectrum correction 18 are the output signal E1(f) of the adder 14 and the output signal E2(f) of the adder 13. First, the correction 18 computes a spectrum signal E3(f) with all the desired frequencies over which noise should be canceled, as follows:

$$E3(f) = W(f) \cdot E1(f) \quad (25)$$

At the frequencies where the spectrum signal E3(f) is higher in level than the signal E2(f), the correction 18 selects the values of the signal E3(f) as output values. At the frequencies where the signal E3(f) is lower than the signal E2(f), the values of the signal E2(f) are substituted for the signal E3(f). The spectrum signal E3(f) corrected by and output from the correction 18 is fed to the input terminal c of the switch 17. The substitution of the signal E2(f) for the signal E3(f) at the frequencies where the signal E3(f) is lower than the signal E2(f) is successful to prevent the spectrum component from reaching zero; otherwise, reproduced sound would be unnatural to the auditory sense.

Figure 10:
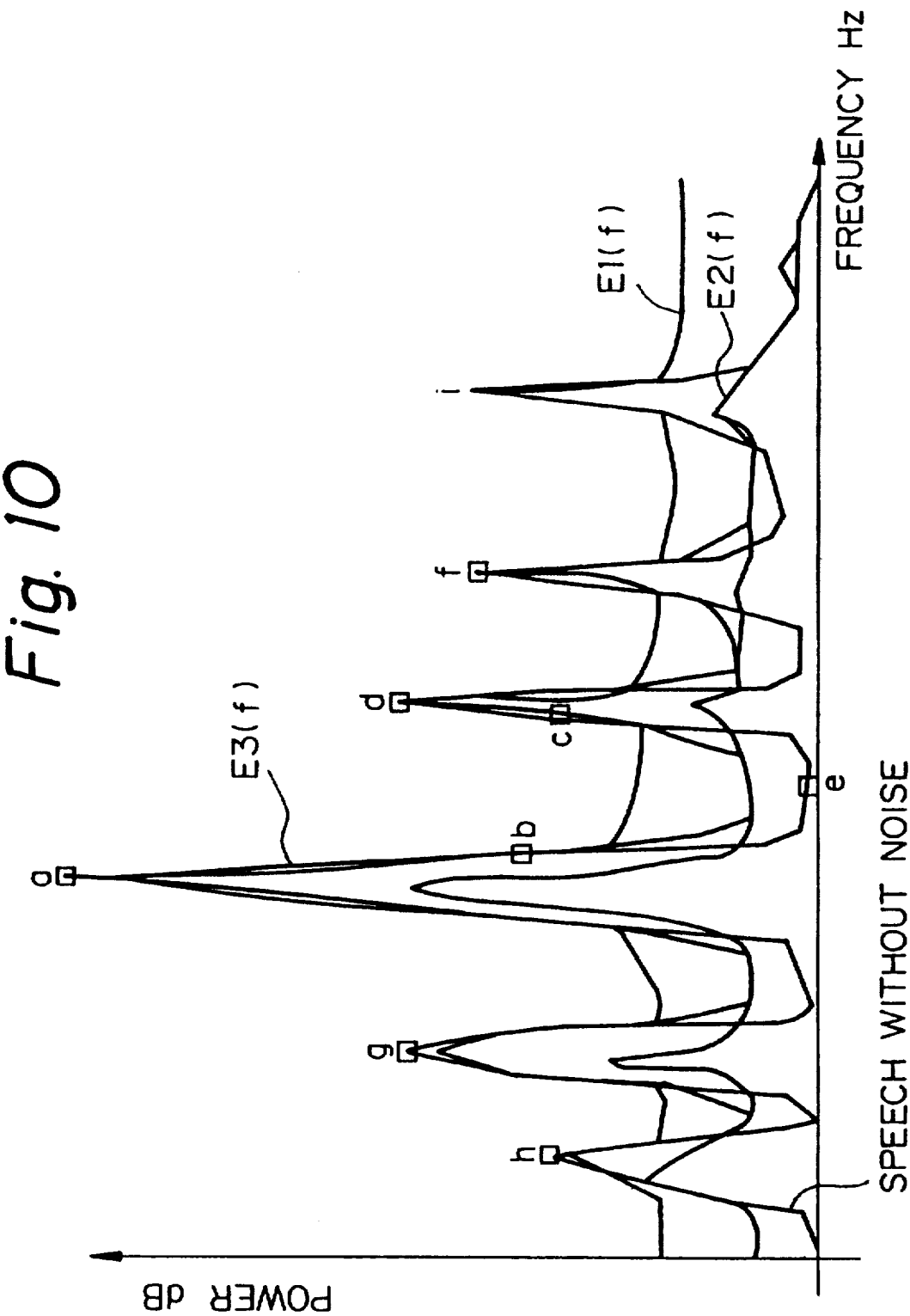
FIG. 10 shows a specific signal output from a spectrum correcting section additionally included in the first embodiment.

FIG. 10 shows the spectrum signal E3(f) output from the spectrum correction 18 and derived from the specific signals of FIG. 8 input to the adaptive window function generation 19. As shown, the spectrum signal E3(f) resembles the spectrum of a noiseless speech signal. As to frequency components around a point i above a point f and where a peak appears, the window function coefficient is limited to 0.0 due to the preselected number of window functions to be generated, so the output signal E3 (f) of the correction 18 is restricted.

The switch 17 receives the output signal of the frequency dimension signal identification 30 as a control signal. The switch 17 selects the output signal of the simple attenuation 16 during noise period (speechless period), selects the output signal of the spectrum correction 18 during speech period with voiced sound, or selects the output signal of the adder 14 during unvoiced speech period. The signal selected by the switch 17 is fed to an inverse FFT 25. The inverse FFT 25 transforms the signal received from the switch 17 and lying in the frequency domain to a signal lying in the time domain. The resulting output signal of the inverse FFT 25 is applied to a window function overlap 24.

The window function overlap 24 causes the input signal to overlap between the consecutive frames in order to cancel the influence of the window function 3, i.e., to allow the speech signal to sound natural when reproduced. The output signal of the overlap 24 is delivered to a digital-to-analog converter (DAC) 26. For example, the input signal may overlap by 50% between consecutive frames. The DAC 26 converts the input digital signal to an analog signal and feeds the analog signal to the following speech signal processing circuit, not shown, via an output terminal 27. The speech signal processing circuit may by a voice communication processing circuit by way of example.

The operation of the above embodiment will be described hereinafter. First, assume that only the background noise N(t) is input to the noise canceler, and then the speech S(t) and background noise N(t) are input together. Also, assume that the switches 5 and 17 are respectively caused to select the output terminal e and input terminal a at the start-up of the noise canceler.

During the initial noise period, the input signal N(t) coming in through the microphone 1 and transformed to an electric signal thereby is converted to a digital signal by the ADC 2. The digital signal is applied from the ADC 2 to the window function 3. The window function 3 executes window function computation with the digital signal frame by frame while delivering its output to the FFT 4. The FFT 4 transforms the frame-by-frame input signal x(k) lying in the time domain to the signal (frequency components) X(f) lying in the frequency domain. The signal X(f) is applied to the noise estimation 6, adders 13, 14 and 28, signal level calculation 15, simple attenuation 16, and frequency dimension signal identification 30.

The signal identification 40 determines whether or not the output signal X(f) of the FFT 4 is a speech signal, and, if it is a speech signal, whether it is representative of voiced sound or unvoiced sound. Basically, during the initial noise period, the signal identification 40 determines that the signal X(f) is speechless. In this condition, the switches 5 and 17 continuously select their output terminal e and input terminal a, respectively. During the initial noise period, the noise estimation 6 estimates noise frame by frame on the basis of the output signal X(F) of the FFT 4 so as to generate the first and second estimated noise signals N'(f) and N"(f). Basically, at this instant, the first estimated noise signal N'(f) is applied to the noise holding 7 via the output terminal e of the switch 5, and the noise holding 7 transfers the signal N'(f) to the adders 8 and 9. Although the signal N'(f) is applied to the crossing detector 21 as well, it has no significance because the switch 17 has selected the input terminal a.

Assume that the background noise occurring during the initial noise period contains narrow band noise. Then, the frequency dimension signal identification 30 is likely to determine that the input signal X(f) is representative of a speech. In this case, the identification 30 causes the switch 5 to select the output terminal f and causes the noise estimation 6 to output the second estimated noise signal N"(f) with its output signal or control signal. At this time, the estimated noise signal N'(f) held by the noise holding 7 is not updated. The noise signal N"(f) output from the switch 5 is fed to the adder 28.

The adder 28 subtracts the input estimated noise signal N"(f) from the output signal X(f) of the FFT 4 (N(f) in this case) so as to cancel noise. The resulting output E4(f) of the FFT 4 is fed to the narrow band noise identification 29. Also applied to the identification 29 is the signal X(f) output from the FET 4 and not subjected to noise cancellation. The identification 29 determines, based on these signals E4(f) and X(f) and the signal MAX(k) output from the speech detector 31 and its frequency fmax, that narrow band noise is present, and reports this condition to the frequency dimension signal identification 30. In response, the identification 30 changes the result of its decision from the presence of a speech to the absence of a speech (noise period). The resulting output signal of the identification 30 causes the switches 5 and 17 to select their output terminal e and input terminal a, respectively.

As stated above, even when a speechless period is erroneously determined to be a speech period, the speech period is replaced with a speechless period immediately. This allows a noise period to be accurately detected even if noise contains narrow band noise.

The estimated noise signal N(f) held by the noise holding 7 during the initial noise period is fed to the multipliers 8 and 9, as stated earlier. The multipliers 8 and 9 respectively multiply the signal N(f) by the noise cancellation coefficients α2 and α1 each determining the degree of cancellation of background noise. Products output from the multipliers 8 and 9, i.e., the estimated noise signals N2'(f) and N1'(f) are delivered to the adders 13 and 14, respectively. It is to be noted that the multiplier 9 functions only to form a signal at the end of the noise period.

The adders 13 and 14 respectively subtract the estimated noise signals N2'(f) and N1'(f) from the output signal X(f) of the FFT 4 (only the noise component signal N(f) in this case). As a result, noise contained in the signal X(f) is cancelled. During noise period, the adder 14 does not play any role because the switch 17 selects the input terminal a.

The signal level calculation 15 calculates the power level information L2 of the signal E2(f) output from the adder 13 and undergone noise cancellation. At the same time, the calculation 15 calculates the power level information L3 of the signal output from the FFT 4 and not subjected to noise cancellation (N(f) because the current period is a noise period). Subsequently, the calculation 15 produces the attenuation coefficient γ4 from the two values L2 and L3 and feeds it to the simple attenuation 16.

The simple attenuation 16 multiplies the frequency components of the output signal of the FFT 4 by the attenuation coefficient γ4. As a result, the spectrum signal γ4 N(f) relating to background noise of low level is output from the attenuation 16 and applied to the inverse FFT 52 via the input terminal a of the switch 17. It is noteworthy that the spectrum signal γ4·N(f) is a signal produced by substituting the level of the output signal E2(f) of the adder 13 for the level of the FFT output signal (background noise) N(f), and in addition not subjected to noise cancellation, i.e., free from distortion ascribable to noise cancellation.

The inverse FFT 25 transforms to a time-domain signal the spectrum signal γ4-N(f) containing only noise components, free from distortion, and reduced in level. The window function overlap 24 causes the output signal of the inverse FFT 25 to overlap between consecutive frames in order to cancel the influence of the operation of the window function 3. The DAC 26 transforms the output signal of the window function overlap 24 to an analog signal and feeds the analog signal to the next circuitry via the output terminal 27, as stated earlier.

Assume that the speech S(t) is introduced into the background noise N(t) being input to the microphone 1. In response, the microphone 1, ADC 2, window function 3 and FFT 4 operate in the same manner as during noise period. In the frequency dimension signal identification 30, the frequency dimension signal detector 31 detects the presence of the speech signal in the output signal X(f) of the FFT 4. As a result, the switch 5 is caused to select the output terminal f. At this instant, although the narrow band noise identification 29 makes a decision on the basis of the output signal E4(f) of the adder 28, the output signal X(f) of the FFT 4, the identification 30 does not replace the presence of a speech with the absence of a speech unless the identification 29 detects narrow band noise.

As stated above, during true speech period, the switch 5 continuously selects the output terminal f, preventing the estimated noise signal N"(f) output from the noise estimation 6 from reaching the noise holding 7. The noise estimation 6 outputs, throughout the speech period, the estimated noise signal N'(f) input just before the end of the noise period.

During speech period, the frequency dimension signal identification 30 causes its voiced/unvoiced discriminator 32 to determine whether the speech signal is voiced or not. The switch 17 selects the input terminal c during voiced period, as determined by the discriminator 30, or selects the input terminal b during unvoiced period.

The noise holding 7 constantly monitors the duration of the speech period. Every time the speech period continues over m frames, the noise holding 7 delivers the past estimated noise signal to the noise estimation 6 so as to update the estimated noise signal of the estimation 6. This successfully prevents, during noise period following the above speech period, estimated noise signals N'(f) and N"(f) to be generated by the estimation 6 from being disturbed by the speech signal.

During voiced period, the multipliers 8 and 9 multiply the estimated noise signal N'(f) appeared at the end of the noise period by the noise cancellation coefficients α2 and α1, respectively. The resulting output signals N'2(f) and N'1(f) of the multipliers 8 and 9 are applied to the adders 13 and 14, respectively. Also applied to the adders 13 and 14 is the output signal X(f) of the FFT 4 on which the speech signal component S(f) and background noise component N(f) have been superposed. The adders 13 and 14 respectively subtract the output signals N'2(f) and N'1(f) of the multipliers 8 and 9 from the signal X(f), outputting two kinds of signals E2(f) and E1(f) each containing a less amount of noise component N(f) than the signal X(f). It should be noted that because the coefficient α2 assigned to the multiplier 8 is greater than the coefficient α1 assigned to the multiplier 9, the output signal E1(f) of the adder 14 is always greater than the output signal E2(f) of the adder 13.

During voiced period, the switch 17 does not select the input terminal a. Therefore, the signal level calculation 15 and simple attenuation 16 both using the output signal E2(f) of the adder 13 are not significant during voiced period. On the other hand, the output signal E1(f) of the adder 14 is applied to the input terminal b of the switch 17. Therefore, if the speech signal contained in the input signal to the noise canceler is unvoiced, the signal E1(f) is fed to the inverse FFT 25 via the switch 17.

The output signal E1(f) of the adder 14 and the estimated noise signal N'(f) output from the noise holding 7 and fixed during voiced period are fed to the adaptive window function generation 19. The output signal E1(f) of the adder 14 and the output signal E2(f) of the adder 13 are delivered to the spectrum correction 18. The window function generation 19 causes its maximum power frequency searcher 20, crossing detector 21, local peak searcher 22 and counter 23 to generate a window function adaptive to the signal E1(f) and feeds the window function to the spectrum correction 18, as stated earlier.

The spectrum correction 18 executes the previously stated processing with the output signal E1(f) of the adder 14 by using the window function. When the resulting signal E3(f) is lower in frequency level than the output signal E2(f) of the adder 13, the correction 18 substitutes the value of the signal E2(f) for the signal E3(f). The signal E3(f) undergone such spectrum correction is fed to the input terminal c of the switch 17. It follows that when the speech signal contained in the signal input to the noise canceler is voiced, the switch 17 selects the above signal E3(f) and delivers it to the inverse FFT 25. In this manner, during speech period and if the speech signal is voiced, the switch 17 selects the signal undergone spectrum correction, free from background noise, and having its speech component enhanced. If the speech signal is unvoiced, the switch 17 selects the signal free from background noise.

Subsequently, the inverse FFT 25, window function overlap 24 and DAC 26 operate in the same manner as during noise period. The resulting output of the DAC 26 appears on the output terminal 27 of the noise canceler.

The embodiment described above has various unprecedented advantages, as follows. A function modeling the depths of valleys is implemented by the signal E2(f) subjected to a higher degree of noise cancellation, so the function can automatically adapt itself to background noise. This makes it needless to use a depth-of-valleys function fixed beforehand although a modeling function is not known, and thereby insures sufficient speech quality in practice.

The number of valleys to be restored is not counted from the lower frequency side, but counted from the frequency corresponding to the maximum power. This allows a reproduced speech to sound natural. For valleys above the valley selected on the frequency dimension, window function coefficients are limited to zero through the limitation of the number of window functions to be generated. Therefore, the output of the noise canceler successfully reflects the general characteristic of speeches, i.e., frequency power which is comparatively high in the low frequency range and comparatively low in the high frequency range. Such a noise canceler is desirable in the auditory sense aspect when applied to, e.g., voice communication.

Further, the frequency dimension speech detector distinguishes a voiced and an unvoiced speech component signal contained in a signal actually input to the noise canceler. The noise canceler therefore operates in a sufficient manner when mounted to any desired apparatus.

Moreover, the adder 28 and narrow band noise identification 29 cooperate to detect narrow band noise. The noise canceler therefore estimates background noise while distinguishing a speech and narrow band noise. This obviates an occurrence that when noise is narrow band noise, the canceler fails to fully cancel the noise by simple frequency subtraction, and generates an erroneous valley of frequencies which would deteriorate speech quality.

SECOND EMBODIMENT

Figure 11A:
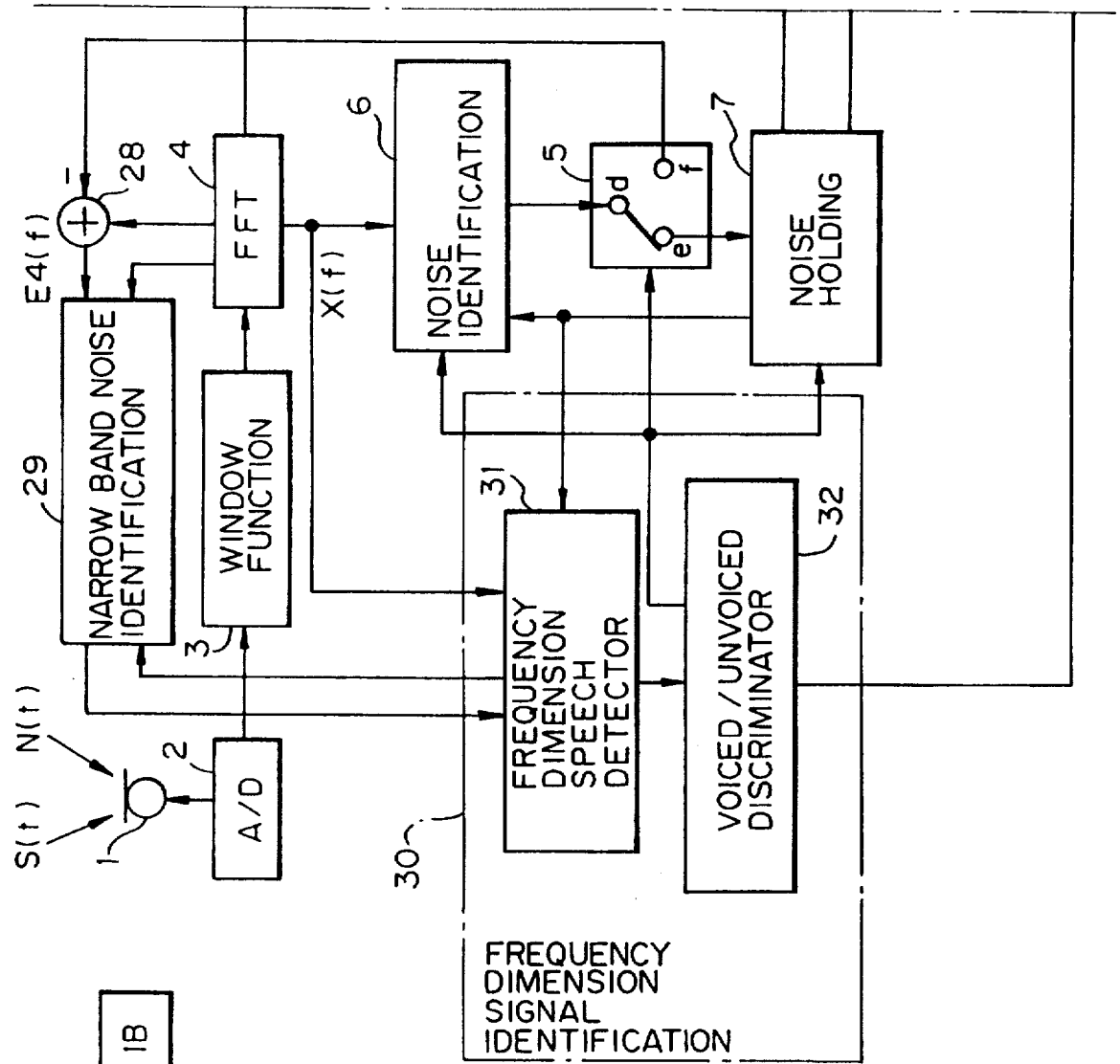
FIGS. 11A and 11B are combined.
Figure 11B:
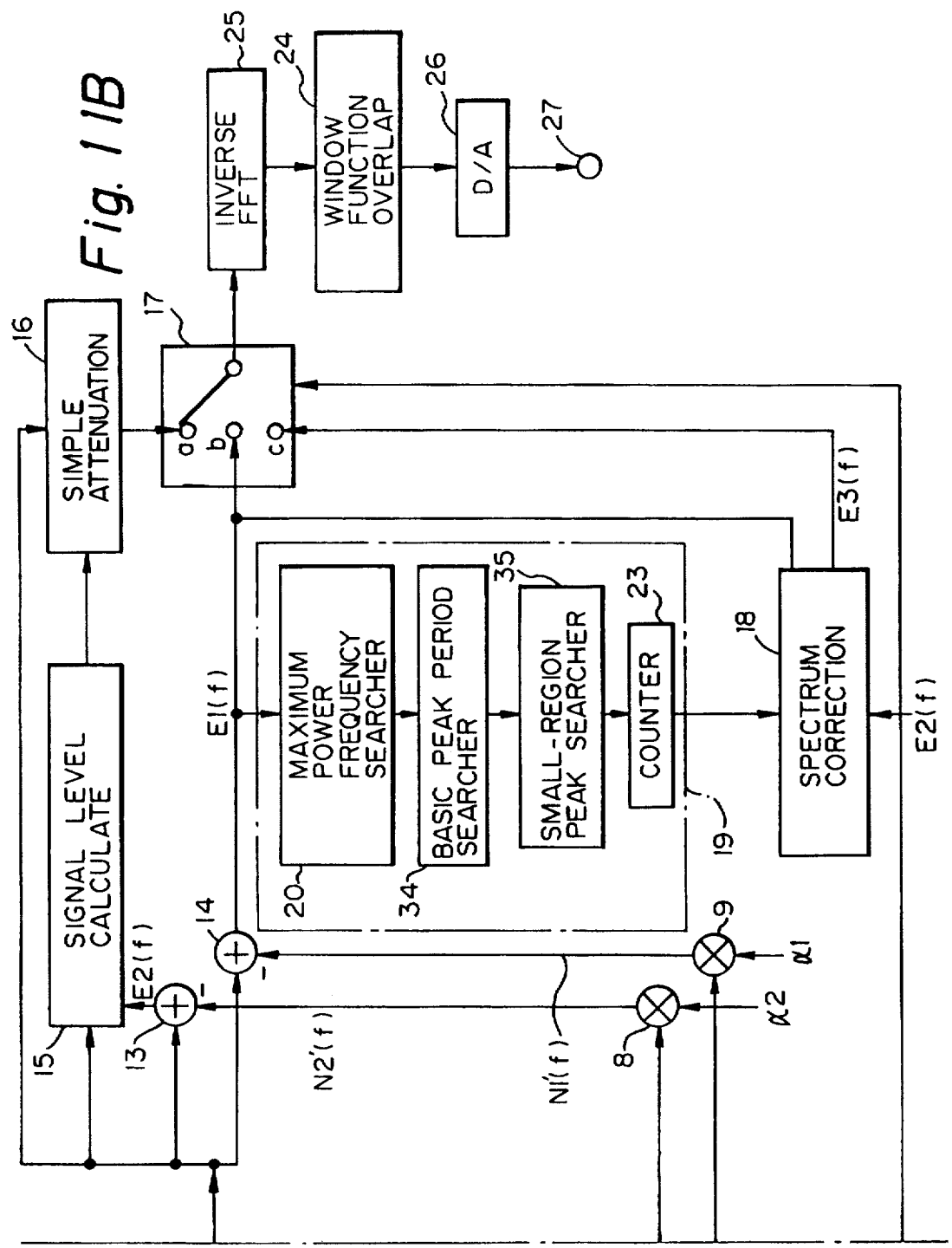

Referring to FIG. 11, a second embodiment of the present invention will be described. In this embodiment, the same or similar structural parts as or to the parts of the first embodiment are designated by identical reference numerals, and a detailed description thereof will not be made in order to avoid redundancy. As shown, this embodiment is identical with the previous embodiment except for the configuration of the adaptive window function generation 19. The generation 19 has a basic peak period searcher 34 and a small-region peak searcher 35 as well as the maximum power frequency searcher 20 and counter 23.

The generation 19 executes window function processing in accordance with the frequency characteristic of the output signal E1(f) of the adder 14, as in the first embodiment. How the generation 19 generates window functions will be described with reference to FIGS. 12 and 13. As shown, the maximum power frequency searcher 20 searches for, among the frequencies of the input signal E1(f), the frequency fmax (point a) corresponding to the maximum power, as in the first embodiment. The searcher 20 delivers information representative of the maximum frequency fmax (frequency fa at the point a) to the basic peak period searcher 34.

The output signal E1(f) of the adder 14 is applied to the basic peak period searcher 34 also. The searcher 34 searches for a peak as to the frequencies above the maximum frequency fmax detected by the searcher 20, as follows. First, the searcher 34 computes the slope def3(f) of the signal E1(f) by using the following equation:

$$def3(f)=E1(f+1)-E1(f) \qquad (26)$$

Figure 12:
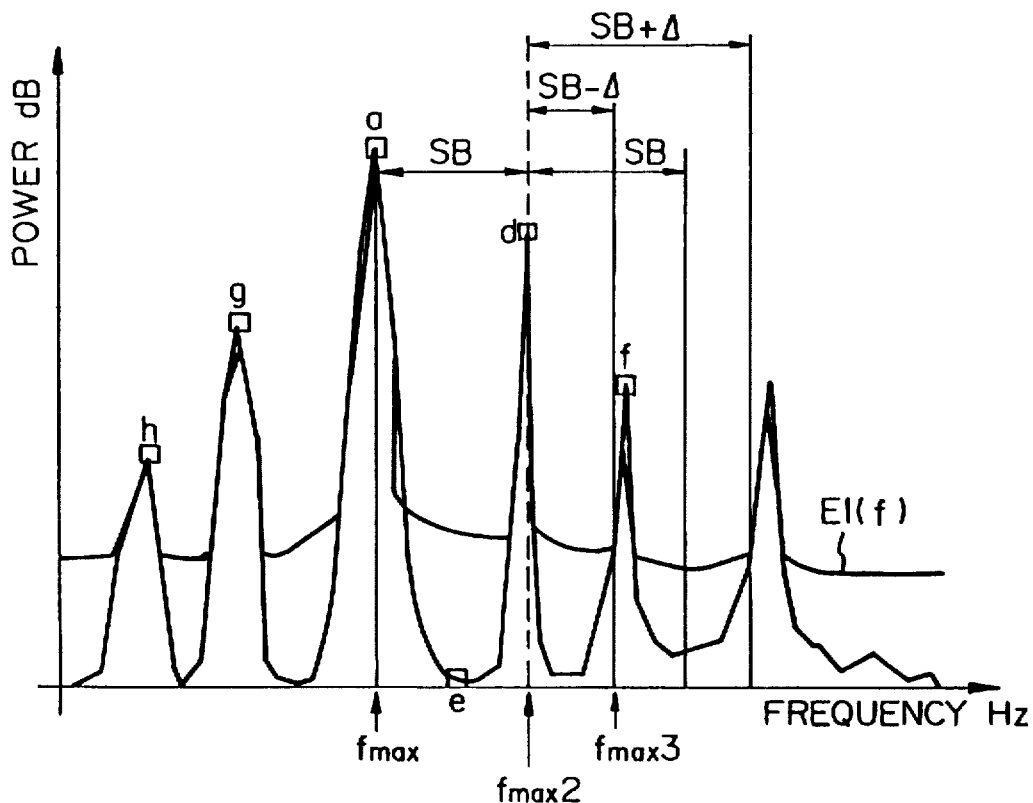
FIGS. 12 and 13 show how an adaptive window function generating section included in the second embodiment generates window functions.

Subsequently, the searcher 34 searches for a peak on the basis of the reversal of sign. Specifically, when the slope def3(f) is zero or negative, the searcher 34 proceeds with the search as to higher frequencies. After the slope def3(f) has turned positive, the searcher 34 starts a peak detection. Then, the searcher 34 determines a frequency at which the sign of the slope def3(f) has again turned negative to be a peak. In the specific case shown in FIG. 12, the searcher 34 does not search for a peak between the points a and e, but starts searching for it from the point e toward the point d. In FIG. 12, the searcher 34 determines the point d to be a peak (second maximum frequency fmax2=fd).

The searcher 34 detected the second maximum frequency fmax2 determines a width SB between the peaks, as follows:

$$SB=fmax2-fmax=fd-fa \qquad (27)$$

Figure 13:
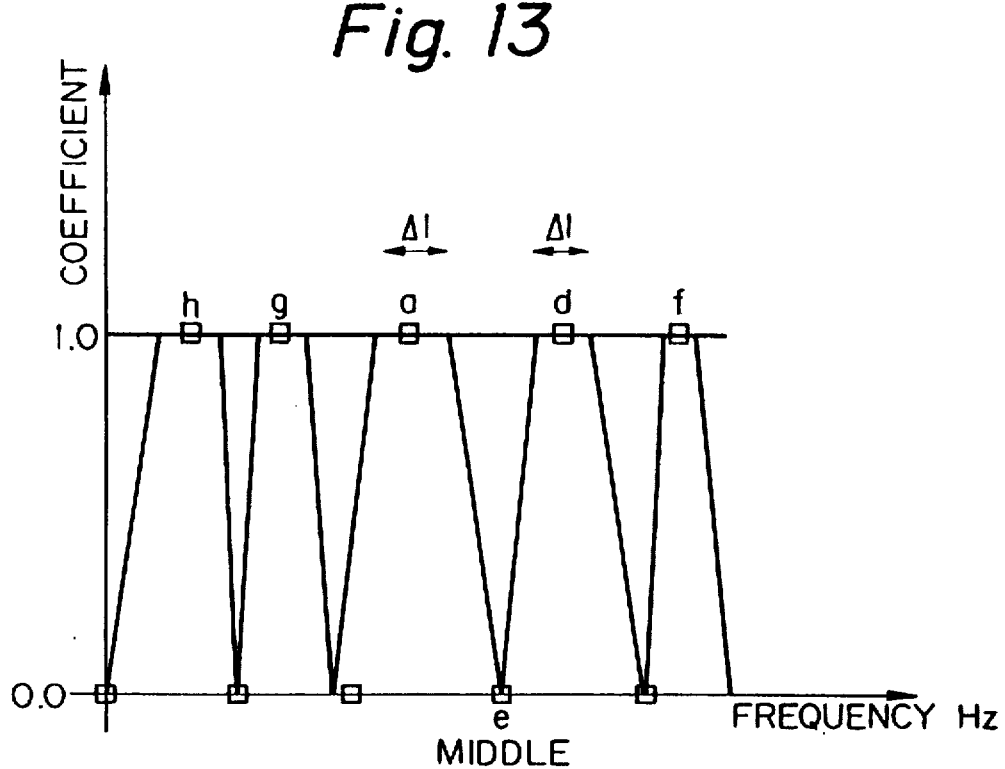

Thereafter, the searcher 34 proceeds with the peak detection by using the above width SB as a reference width. Further, the searcher 34 generates a window function for a basic period portion. As shown in FIG. 13, the window function for a basic period portion has a width of $\Delta\frac{1}{2}$ at each side of the maximum frequency fmax on the frequency dimension, and has a bottom (point e; frequency fe) coincident with the middle point between the maximum frequency fmax (point a) and the second maximum power frequency fmax2 (point d). Let the above width $\Delta1$ be denoted by 2q. Then, the window function generated by the searcher 34 has the following window function coefficient W(f) at the inclined portion adjoining the frequency fmax (=fa):

$$W(f)=-(f-fe)/\{fe-(fa+q)\} \qquad (28)$$

At the same time, the above window function has the following window function coefficient W(f) at the inclined portion adjoining the frequency fmax2(=fd):

$$W(f)=(f-fe)/\{(fd-q)-fe\} \qquad (29)$$

The window function generated by the searcher 34 is fed to the spectrum correction 18 via the small-region peak searcher 35. Because the window function is symmetrical with respect to the middle point e, i.e., frequency fe, the following equation holds:

$$-1/\{(fd-q)-fe\}=1/\{fe-(fa+q)\} \qquad (30)$$

Therefore, the equation (29) may be replaced with:

$$W(f)=(f-fe)/\{fe-(fa+q)\} \qquad (31)$$

The preselected frequency width $\Delta1$ may be 10 Hz by way of example. The frequency width or margin $\Delta1$ allows the embodiment to adapt itself to the spread of the spectrum of the speech signal component.

The second maximum or peak frequency fmax2 is fed from the searcher 34 to the small-region peak searcher 35. The searcher 35 uses the peak frequency fmax2 as a new maximum frequency fmax, and then searches for a new maximum frequency (denoted by fmax3 for distinction) only within the higher frequency range of from SB–$\Delta$ to SB+$\Delta$ on the frequency dimension. It is to be noted that $\Delta$ is a constant for absorbing irregularity in the peak period of the spectrum and may be, but not limited to, 10 Hz.

After the maximum frequency fmax (fmax2) and second maximum frequency fmax3 have been produced with respect to the above new small region, the searcher 35, like the searcher 20, generates a window function based on the frequencies fmax and fmax3. The resulting window function coefficients are fed to the spectrum correction 18.

The counter 23 is incremented by 1 every time the searcher 35 generates a window function. The searcher 35 repeats the above procedure until the counter 23 reaches a preselected count, e.g., 2.

As for frequencies below the frequency fmax output from the maximum power frequency searcher 20 on the frequency dimension, the basic peak period searcher 34 and small-region peak searcher 35 repeat the above window function processing except for the direction in which the processing proceeds on the frequency dimension.

This embodiment similar to the previous embodiment in construction in operation achieves not only the previously stated advantages, but also the following advantage. In the illustrative embodiment, the adaptive window function generation 19 causes the searcher 20 to detect a frequency indicative of the maximum power in the frequency domain. After the maximum power frequency and the second maximum power frequency have been produced, the searcher 34 generates a window function for a basic portion and determines a basic search period. Then, the searcher 35 generates the second and successive window functions. Specifically, the searcher 35 detects a maximum value only over a limited section having some margin, compared to the basic search period, and then generates a window function by using values up to the maximum value as the window function width of a small region. This reduces computation requirements for the generation of window functions, and thereby scales down both software and hardware assigned to adaptive window function generation.

THIRD EMBODIMENT

Figure 14B:
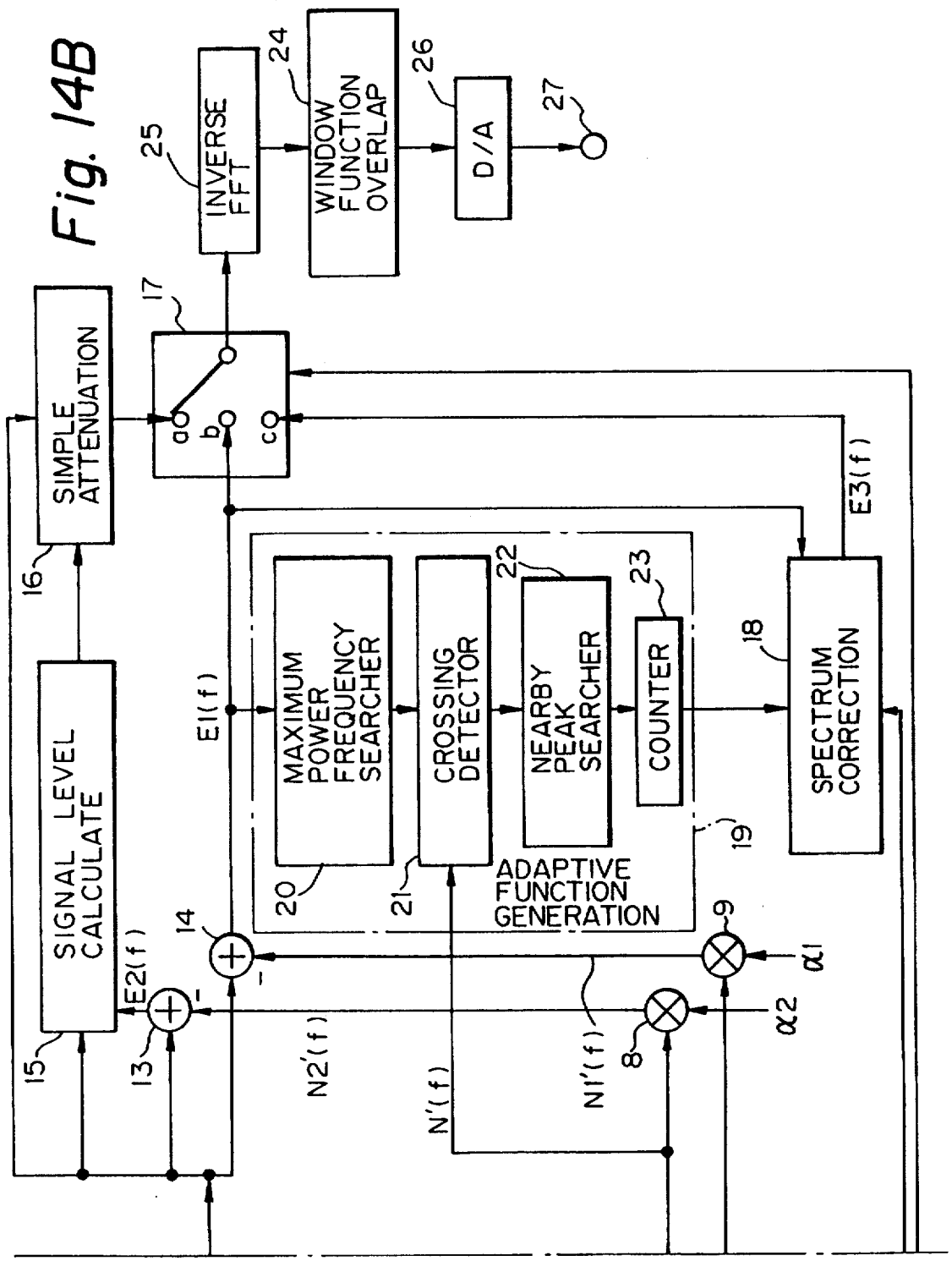

FIG. 14 shows a third embodiment of the present invention. In this embodiment, the same or similar structural parts as or to the parts of the first embodiment are designated by identical reference numerals, and a detailed description thereof will not be made in order to avoid redundancy. As shown, this embodiment is identical with the first embodiment except that the output signal of the narrow band noise identification 29 is not applied to the frequency dimension signal identification 30, but applied to the spectrum correction 18, and that the identification 29 and correction 18 operate in different ways.

In this embodiment, if the output signal of the identification 30 is indicative of the presence of a speech, whether it be voiced or unvoiced, the switch S selects the output terminal f. Assume that the switch S selects the output terminal f because the speech is unvoiced. Then, the output signal E3(f) of the correction 18 using the information output from the identification 29 is not selected by the switch 17.

Specifically, a precondition with this embodiment is that most of the background noise containing narrow band noise be detected as a voiced speech signal. Another precondition is that most of the speech signals on which narrow band nose is superposed be also detected as a voiced speech signal.

When the switch 5 selects the output terminal f, the estimated noise signal N"(f) output from the noise estimation 6 is applied to the adder 28. The adder 28 performs noise cancellation with the output signal X(f) of the FFT 4 by using the signal N"(f). The output signal E4(f) of the adder 28 and free from background noise is fed to the narrow band noise identification 29. In response, the identification 29 produces all the peak frequencies MAX2_E4(k) from the signal E4(f) over the entire frequencies sf through ef. It is to be noted that the maximum frequency fmax output from the frequency dimension signal identification 30 is excluded from the peak frequencies MAX2_E4(k).

More specifically, the identification 29 determines the slopes def_2(f) and def_22(f) of the signal E4(f) where sampling points are adjacent to each other, as follows:

$$def\_2(f) = E4(f+1) - E4(f) \quad (32)$$

$$def\_22(f) = E4(f) - E4(f-1) \quad (33)$$

When the slope def_2(f) at the higher frequency side is negative at a certain frequency f, and the slope def_22(f) at the lower frequency side is greater than zero at the same frequency f, the identification 29 determines that the frequency f is a peak frequency MAX2_E4(k). Because a plurality of peak frequencies MAX2_E4(k), as distinguished from the maximum frequency fmax, exist, they are expected to be denoted by MAX2_E4(fi, k) (i being 1 through n which is the maximum number of peaks selected beforehand). However, let the peak frequencies MAX2_E4(k) be denoted by MAX2_E4(fi) for simplicity hereinafter.

Figure 15:
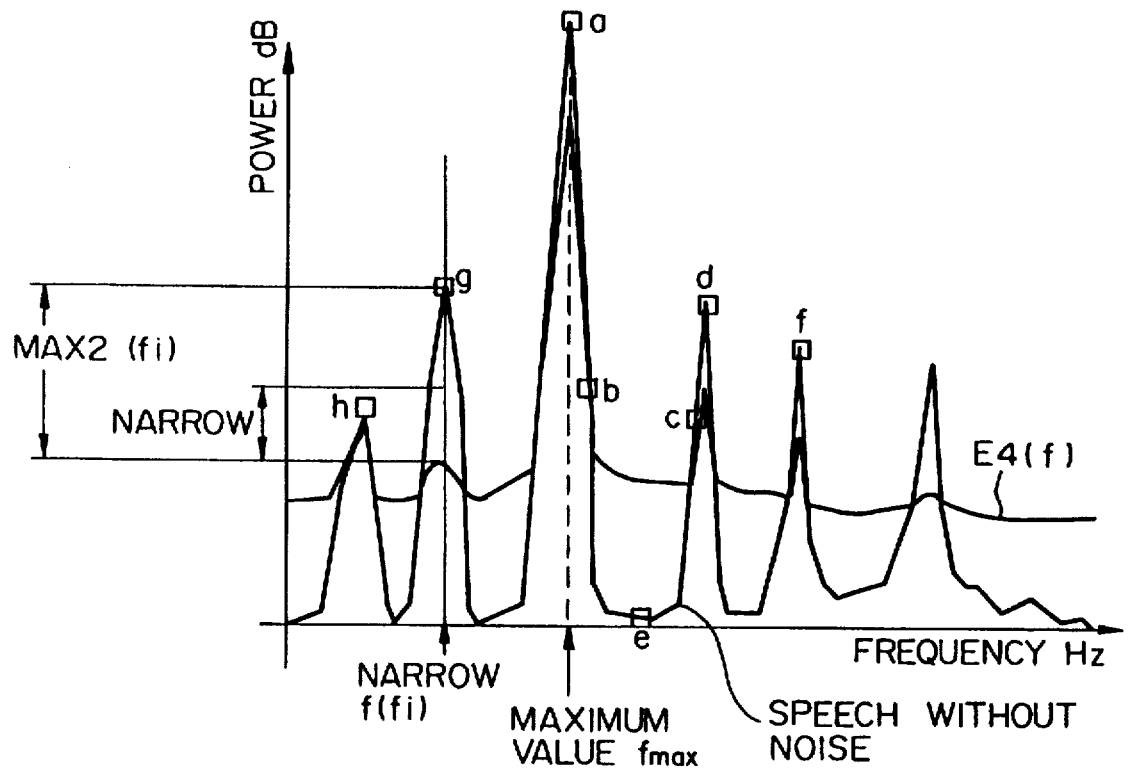
FIG. 15 shows a specific operation of a narrow band noise identifying section included in the third embodiment.

FIG. 15 demonstrates how a frequency NARROW_f(fi) is detected, where the frequency NARROW_f(fi) belongs to a group of peak frequencies MAX2_E4(fi), and relates to narrow band noise. The narrow band noise identification 29 compares a difference between each peak frequency MAX2_E4(fi) and N'(f) (output from the noise holding 7 via the detector 31) with a preselected threshold NARROW. If the difference is greater than the threshold NARROW, the identification 29 determines it to be a frequency NARROW_f(fi) relating to narrow band noise. The frequency NARROW_f(fi) is fed from the identification 29 to the spectrum correction 18. In the specific case shown in FIG. 15, among five peak frequencies other than the maximum frequency fmax, the peak frequency appearing at a point g is the above frequency NARROW_f(fi).

The spectrum correction 18 lowers the gain (window function coefficient) of the window function containing the input frequency NARROW_f(fi) as a frequency component. Specifically, the correction 18 multiplies, among the window functions or window function coefficients W(f) sequentially generated by the generation 19 as in the first embodiment, the window function containing the frequency NARROW_f(fi) by an attenuation coefficient γ5 and thereby produces a window function or window function coefficient N_W(f):

$$N\_W(f) = \gamma 5 \cdot W(f) \quad (34)$$

The attenuation coefficient γ5 may be, but not limited to, 0.1.

Figure 16:
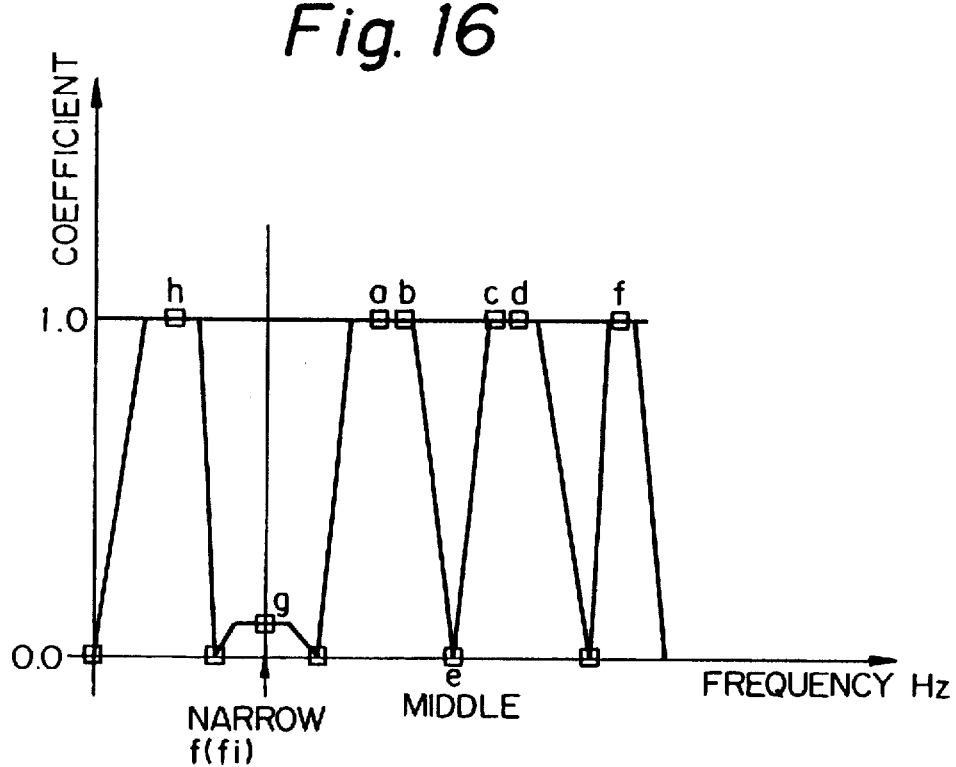
FIG. 16 shows specific window functions corrected by a spectrum correcting section also included in the third embodiment.

FIG. 16 corresponds to FIG. 15 and shows all the window functions output form the adaptive window function generation 19 and then partly corrected by the spectrum correction 18 on the basis of the frequency NARROW_f(fi).

Subsequently, the correction 18 corrects the spectrum of the output signal E1(f) of the adder 14 by using the window functions W(f) partly corrected to N_W(f). As a result, only for the frequency band of the signal E1(f) corresponding to the window function W(f) turned out N_W(f), a corrected signal E3(f) represented by the following equation is generated, in other band (there is no narrow band noise) N_W(f)=W(f) or γ5=1.0:

$$E3(f) = N\_W(f) \cdot E1(f) \quad (35)$$

$$= \gamma 5 \cdot W(f) \cdot E1(f)$$

FIG. 17 shows a specific signal output from the spectrum corrector 18 by the above procedure.

As stated above, even when the input signal to the noise canceler contains narrow band noise, the narrow band noise identification 29 and spectrum correction 18 cooperate to produce the signal E3(f) free from the narrow band noise. For example, even if the input signal consists of narrow band noise, usual noise and a speech superposed on each other, the adder 14 cancels the usual noise while the correction 18 cancels the narrow band noise. As a result, the signal E3(f) output from the correction 18 is free from noise and has its speech enhanced.

If desired, an arrangement may be made such that the output signal E2(f) of the adder 13 is applied to the correction 18 in order to prevent the output signal E3(f) of the correction 18 from falling in level to an excessive degree, as in the first embodiment.

The third embodiment has an advantage that even when narrow band noise and speech signal exist together, the narrow band noise is effectively reduced. This advantage is derived from a unique configuration wherein the narrow band noise identification 29 identifies narrow band noise while delivering its output to the spectrum correction 18, and the correction 18 reduces the gain of a window function portion containing the narrow band frequencies and thereby outputs a corrected spectrum. Of course, this embodiment achieves the various advantages stated earlier in relation to the first embodiment as well.

FOURTH EMBODIMENT

A reference will be made to FIG. 18 for describing a fourth embodiment of the present invention. In this embodiment, the same or similar constituent parts as or to the parts of the first to third embodiments are designated by identical reference numerals, and a detailed description thereof will not be made in order to avoid redundancy. As shown, this embodiment has the adaptive window function generation 19 of the second embodiment in place of the generation 19 of the first embodiment, and uses the narrow band noise detecting and canceling scheme of the third embodiment in place of the scheme of the first embodiment. With this configuration, the fourth embodiment also achieves the advantage derived from the regulator 19 of the second embodiment, and the advantage derived from the narrow band noise detecting and canceling scheme of the third embodiment in addition to the advantages of the first embodiment.

In summary, it will be seen that the present invention provides a noise canceler capable of switching a noise canceling characteristic on detecting narrow band noise, and thereby executing noise cancellation adequately despite narrow band noise.

Further, the noise canceler selects an output signal having a particular noise canceling characteristic, depending on whether or not a speech signal contained in an input acoustic signal is voiced. In addition, the noise canceler adaptively changes, for an acoustic signal containing voiced sound, a window function which regulates the depth of a valley of an attenuation characteristic meant for the acoustic signal. Therefore, the noise canceler improves an output signal with respect to the auditory sense and sound quality without regard to narrow band noise.

The entire disclosure of Japanese patent application No. 154179/1996 filed on Jun. 14, 1996 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope thereof. For example, the transform between the signal on the time dimension and the signal on the frequency dimension may be effected by any suitable scheme other than the FFT and inverse FFT scheme. The switches for selecting a particular processing line for each of a voiced period, unvoiced period and noise period may be arranged at any suitable positions other than the positions shown and described.

As regards the subtraction for determining whether or not a speech is present and whether or not the speech is voiced, the terms included in the equations may be replaced with each other. This is also true with the ratios used for the above decisions. In such a case, thresholds and their relation in size, for example, will be inverted as well as the results of decisions. The identification for determining the kind of a signal may operate on the basis of a signal on the time dimension (ADC output signal), in which case the narrow band noise identifying section will also be constructed to process the signal on the frequency dimension.

The simple linear window functions shown and described may be replaced with, e.g., Hamming window functions. Further, the adaptive window function generating section for outputting the window functions may received the output of the FFT section. Moreover, an arrangement may be made such that the number of window function portions (trapezoidal portions) to be generated by the adaptive window function generating section can be varied at the outside of an apparatus on which the noise canceler is mounted. The present invention is, of course, applicable to speech inputting means included any kind of apparatus other than a voice communication apparatus.

What is claimed is:

1. A noise canceler comprising:

first transforming means for transforming an input acoustic signal lying on a time dimension to an acoustic signal lying on a frequency dimension;

signal identifying means for determining whether or not the input acoustic signal consists only of background noise, or whether or not the input acoustic signal contains a speech signal, or when the input acoustic signal contains a speech signal, whether the speech signal is representative of voiced sound or unvoiced sound;

noise estimating means for narrow band noise detection and for estimating, in response to an acoustic signal output from said first transforming means, background noise while tracking the input acoustic signal to thereby output an estimated noise signal for detection of narrow band noise;

noise cancellation calculating means for narrow band noise detection and for subtracting, at least when an output signal of said signal identifying means is indicative of presence of a speech, said estimated noise signal from said acoustic signal output from said first transforming means; and narrow band noise identifying means for determining, based on a relation in level between said acoustic signal input to said noise cancellation calculating means and a corresponding signal output from said noise cancellation calculating means, whether or not the input acoustic signal contains narrow band noise, or for detecting a frequency range of the narrow band noise;

wherein a noise cancellation characteristic of an output signal of said noise canceler is varied in accordance with an output signal of said narrow band noise identifying means.

2. A noise canceler in accordance with claim 1, further comprising:

first background noise estimating means for estimating, in response to said acoustic signal output from said first transforming means, background noise while tracking the input acoustic signal to thereby output an estimated noise signal, and for repeatedly outputting, when the input acoustic signal contains a speech signal, said estimated noise signal, but appeared just before appearance of said speech signal;

second background noise estimating means for estimating, in response to said acoustic signal output from said first transforming means and only if the input acoustic signal consists only of background noise, background noise while following the input acoustic signal to thereby output an estimated noise signal, or for repeatedly outputting, when the input acoustic signal contains a speech signal, said estimated noise signal, but appeared just before appearance of said speech signal;

first multiplying means for multiplying, at least when the input acoustic signal contains a speech signal, said estimated noise signal output from said first or second background noise estimating means by a first coefficient;

first noise cancellation calculating means for subtracting a multiplied estimated noise signal output from said first multiplying means from said acoustic signal output from said first transforming means;

adaptive window function generating means for generating a window function in accordance with a frequency characteristic of either one of an output signal of said first noise cancellation calculating means and said acoustic signal output from said first transforming means;

spectrum correcting means for correcting a spectrum of said output signal of said first noise cancellation calculating means on the basis of said window function generated by said window function generating means;

selecting means for selecting an output signal of said spectrum correcting means when the input acoustic signal contains a speech signal representative of voiced sound, or selecting said output signal of said first noise cancellation calculating means; and second transforming means for transforming said output signal selected by said selecting means to a signal lying on a time dimension;

wherein when said output signal of said narrow band noise identifying means is indicative of presence of narrow band noise, presence of a speech represented by said output signal of said signal identifying means is replaced with absence of a speech.

3. A noise canceler in accordance with claim 2, further comprising:

second multiplying means for multiplying, at least when the input acoustic signal consists only of background noise, said estimated noise signal output from said background noise estimating means by a second coefficient greater than said first coefficient;

second noise cancellation calculating means for subtracting a multiplied estimated noise signal output from said second multiplying means from said acoustic signal output from said time dimension/frequency dimension transforming means; and attenuating means for attenuating, based on a relation in level between said acoustic signal input to said second noise cancellation calculating means and a corresponding output of said second noise cancellation calculating means, said acoustic signal on the frequency dimension;

wherein said selecting means selects an output signal of said distortion-free attenuating means when the input acoustic signal consists only of background noise.

4. A noise canceler in accordance with claim 3, wherein when the signal corrected by said spectrum correcting means has a level lower than said output signal of said second noise cancellation calculating means, said spectrum correcting means determines a frequency portion corresponding to said signal corrected to be representative of said excessively deep valley, and then replaces said frequency portion with said output signal of said second noise cancellation calculating means.

5. A noise canceler in accordance with claim 2, wherein said adaptive window function generating means comprises:

a maximum power frequency searcher for searching for a maximum frequency corresponding to a maximum peak power of the signal input to said adaptive window function generating means;

a crossing detector for detecting a crossing point where a level of the signal input to said adaptive window function generating means and a level of said estimated background noise signal output from said noise estimating means cross each other; and a nearby peak searcher for searching for a peak whose frequency has a peak close to said maximum frequency;

wherein said adaptive window function generating means generates the window function on the basis of said maximum frequency and said frequency at said crossing point.

6. A noise canceler in accordance with claim 5, wherein said adaptive window function generating means further comprises a limiting section for causing a preselected number of trapezoidal window function portions to be generated at each of opposite sides of said maximum frequency.

7. A noise canceler in accordance with claim 6, wherein the window function has a zero gain in a frequency range above said preselected number at a higher frequency side with respect to said maximum frequency.

8. A noise canceler in accordance with claim 2, wherein said adaptive window function generating means comprises:

a maximum power frequency searcher for searching for a maximum frequency corresponding to maximum power of the signal input to said adaptive window function generating means;

a basic peak period searcher for computing a basic width between consecutive frequency peaks by using a frequency corresponding to maximum power as a reference; and a small-region peak searcher for searching a peak frequency in each of small regions deviated by said basic width;

wherein said adaptive window function generating means generates the window function on the basis of said maximum frequency and said peak frequency.

9. A noise canceler in accordance with claim 2, wherein when the signal corrected in spectrum by said spectrum correcting means in accordance with the window function has an excessively deep valley, said spectrum correcting means raises said excessive deep valley to a preselected level.

10. A noise canceler in accordance with claim 1, further comprising:

first background noise estimating means for estimating, in response to said acoustic signal output from said first transforming means, background noise while tracking the input acoustic signal to thereby output an estimated noise signal, and for repeatedly outputting, when the input acoustic signal contains a speech signal, said estimated noise signal, but appeared just before appearance of said speech signal;

second background noise estimating means for estimating, in response to said acoustic signal output from said first transforming means and only if the input acoustic signal consists only of background noise, background noise while tracking the input acoustic signal to thereby output an estimated noise signal, or for repeatedly outputting, when the input acoustic signal contains a speech signal, said estimated noise signal, but appeared just before appearance of said speech signal;

first multiplying means for multiplying, at least when the input acoustic signal contains a speech signal, said estimated noise signal output from said first or second background noise estimating means by a first coefficient;

first noise cancellation calculating means for subtracting a multiplied estimated noise signal output from said first multiplying means from said acoustic signal output from said first transforming means;

adaptive window function generating means for generating a window function in accordance with a frequency characteristic of either one of an output signal of said first noise cancellation calculating means and said acoustic signal output from said first transforming means;

spectrum correcting means for correcting a spectrum of said output signal of said first noise cancellation calculating means on the basis of said window function generated by said window function generating means;

selecting means for selecting an output signal of said spectrum correcting means when the input acoustic signal contains a speech signal representative of voiced sound, or selecting said output signal of said first noise cancellation calculating means; and second transforming means for transforming said output signal selected by said selecting means to a signal on the time dimension;

wherein said spectrum correcting means reduces, in said window function generated by said window function generating means, a gain of a frequency component representative of the narrow band noise identified by said narrow band noise identifying means, and then corrects the spectrum.

11. A noise canceler in accordance with claim 10, further comprising:

second multiplying means for multiplying, at least when the input acoustic signal consists only of background noise, said estimated noise signal output from said background noise estimating means by a second coefficient greater than said first coefficient;

second noise cancellation calculating means for subtracting a multiplied estimated noise signal output from said second multiplying means from said acoustic signal output from said time dimension/frequency dimension transforming means; and attenuating means for attenuating based on a relation in level between said acoustic signal input to said second noise cancellation calculating means and a corresponding output of said second noise cancellation calculating means, said acoustic signal on the frequency dimension;

wherein said selecting means selects an output signal of said distortion-free attenuating means when the input acoustic signal consists only of background noise.

12. A noise canceler in accordance with claim 10, wherein said adaptive window function generating means comprises:

a maximum power frequency searcher for searching for a maximum frequency corresponding to a maximum peak power of the signal input to said adaptive window function generating means;

a crossing detector for detecting a crossing point where a level of the signal input to said adaptive window function generating means and a level of said estimated background noise signal output from said noise estimating means cross each other; and a nearby peak searcher for searching for a peak whose frequency has a peak close to said maximum frequency;

wherein said adaptive window function generating means generates the window function on the basis of said maximum frequency and said frequency at said crossing point.

13. A noise canceler in accordance with claim 10, wherein said adaptive window function generating means comprises:

a maximum power frequency searcher for searching for a maximum frequency corresponding to maximum power of the signal input to said adaptive window function generating means;

a basic peak period searcher for computing a basic width between consecutive frequency peaks by using a frequency corresponding to maximum power as a reference; and a small-region peak search for searching a peak frequency in each of small regions deviated by said basic width;

wherein said adaptive window function generating means generates the window function on the basis of said maximum frequency and said peak frequency.

14. A noise canceler in accordance with claim 12, wherein said adaptive window function generating means further comprises a limiting section for causing a preselected number of trapezoidal window function portions to be generated at each of opposite sides of said maximum frequency.

15. A noise canceler in accordance with claim 14, wherein the window function has a zero gain in a frequency range above said preselected number at a higher frequency side with respect to said maximum frequency.

16. A noise canceler in accordance with claim 10, wherein when the signal corrected in spectrum by said spectrum correcting means in accordance with the window function has an excessively deep valley, said spectrum correcting means raises said excessive deep valley to a preselected level.

17. A noise canceler in accordance with claim 1, wherein said signal identifying means comprises:

a frequency dimension speech detector for determining whether or not a speech is present by comparing with a first threshold a value which is a difference or a ratio between a mean power value, as calculated on the frequency dimension, of said estimated background noise signal output from said noise estimating means and a mean power value of said acoustic signal output from said first transforming means; and a voiced/unvoiced discriminator for determining, when a speech is present, whether the speech is voiced or unvoiced on the basis of a relation in size between said value and a second threshold and a relation between a maximum value on the frequency dimension, a power ratio of said estimated background noise, and a third threshold.

* * * * *